US010515604B2

(12) United States Patent
Chung et al.

(10) Patent No.: US 10,515,604 B2
(45) Date of Patent: Dec. 24, 2019

(54) DISPLAY DEVICE AND DRIVING METHOD THEREOF

(71) Applicant: LG DISPLAY CO., LTD., Seoul (KR)

(72) Inventors: Moonsoo Chung, Goyang-si (KR); Yousung Nam, Gwangmyeong-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/710,583

(22) Filed: Sep. 20, 2017

(65) Prior Publication Data

US 2018/0096666 A1 Apr. 5, 2018

(30) Foreign Application Priority Data

Sep. 30, 2016 (KR) ........................ 10-2016-0127116

(51) Int. Cl.
*G09G 3/36* (2006.01)
*G06F 3/038* (2013.01)

(52) U.S. Cl.
CPC ......... *G09G 3/3688* (2013.01); *G09G 3/3696* (2013.01); *G09G 2300/0804* (2013.01); *G09G 2310/0297* (2013.01); *G09G 2310/08* (2013.01); *G09G 2320/0673* (2013.01); *G09G 2320/103* (2013.01); *G09G 2330/021* (2013.01); *G09G 2340/0435* (2013.01)

(58) Field of Classification Search
USPC .................................................... 345/87–104
See application file for complete search history.

(56) References Cited

U.S. PATENT DOCUMENTS

2008/0170027 A1* 7/2008 Kyeong ............... G09G 3/3688 345/100
2010/0001984 A1* 1/2010 Kim ..................... G09G 3/3696 345/212
2010/0085375 A1* 4/2010 Chung ................ G09G 3/3406 345/589
2012/0320098 A1* 12/2012 Kwak .................. G09G 3/2003 345/690
2013/0141474 A1* 6/2013 Kim ...................... H03M 1/682 345/690
2015/0091784 A1* 4/2015 Kwon ..................... H03M 1/72 345/77
2015/0103104 A1* 4/2015 Lee ...................... G09G 3/3648 345/690
2016/0148564 A1* 5/2016 Kim ..................... G09G 3/3233 345/211
2017/0132975 A1* 5/2017 Park ..................... G09G 3/3233
2017/0213517 A1* 7/2017 Lee ...................... G09G 3/3688

* cited by examiner

*Primary Examiner* — Kwin Xie
(74) *Attorney, Agent, or Firm* — Seed Intellectual Property Law Group LLP

(57) ABSTRACT

A liquid-crystal display device and a driving method thereof are disclosed. The driving method of the liquid-crystal display device comprises: generating first and second power supply voltages; generating gamma-compensated voltages based on the first and second power supply voltages; converting data of an input image to the gamma-compensated voltages to output data voltages; distributing, by a multiplexer, the data voltages output from the data driver to a plurality of data lines; and varying at least one of the first and second power supply voltages at a given time interval.

20 Claims, 26 Drawing Sheets

(A)

(B)

(C)

FR(N+1)

FR(N)

FR(N)

DISPLAY DEVICE AND DRIVING METHOD THEREOF

This application claims the priority benefit of Korean Patent Application No. 10-2016-0127116 filed on Sep. 30, 2016, the entire contents of which is incorporated herein by reference for all purposes as if fully set forth herein.

BACKGROUND

Technical Field

The present disclosure relates to a display device that has a multiplexer between a data driver and a display panel and can be driven in slow driving mode, and a driving method thereof.

Description Discussion of the Related Art

Various flat panel displays are available in the market, including liquid crystal display devices (LCDs) and organic light-emitting diode displays (hereinafter, "OLED displays"). In an active matrix display device, each pixel has a thin-film transistor (hereinafter, "TFT").

In the liquid-crystal display device, the polarity of data voltages applied to subpixels is reversed in order to reduce afterimages and flicker. The polarity of data voltages can be reversed by dot inversion, line inversion, column inversion, etc. A dot is a sub-pixel. In the dot inversion method, data voltages applied to sub-pixels adjacent in vertical and horizontal directions are controlled to be opposite in polarity. In the line inversion method, data voltages applied to adjacent lines are controlled to be opposite in polarity. Here, a line refers to a row line in which pixels are arranged horizontally on a pixel array of the display panel. In the dot inversion and line inversion methods, the polarity of data voltages applied to data lines is reversed with every horizontal period or every 2 horizontal periods, and also with every frame. 1 horizontal period is the time needed to write data to 1 line of pixels on the display panel 100. In the line inversion method, common voltage Vcom may be reversed to a polarity opposite to that of data voltages in order to reduce data voltage swing. In the column inversion method, data voltages applied to adjacent columns are controlled to be opposite in polarity. In the column inversion method, the polarity of data voltages applied to one data line remains the same during 1 frame, and is reversed in the next frame. Here, a column refers to a column line in which pixels are arranged vertically on a pixel array of the display panel.

A flat panel display such as a liquid-crystal display device comprises a display panel on which data lines and gate lines (or scan lines) intersect and pixels in a pixel array are arranged in a matrix, a display panel drive circuit for writing data of an input image to the display panel, and a timing controller. The display panel drive circuit comprises a data driver for supplying data voltages to the data lines on the display panel and a gate driver for sequentially supplying gate pulses (or scan pulses) to the gate lines on the display panel. In the case of mobile devices, the data driver and the timing controller may be integrated in a single drive IC (integrated circuit) chip.

To reduce power consumption, a display device for a mobile device may drive the pixels at a slow rate when there is little variation in an input image. Although a variety of slow driving methods are being proposed, they may have image quality degradation issues. Thus, there is a need for a solution that can solve these issues of image quality degradation in a slow driving mode of the display device.

BRIEF SUMMARY

The present disclosure provides a display device and a driving method thereof capable of improving image quality in a slow driving mode.

In one or more embodiments, a display device is provided that includes: a display panel on which data lines and gate lines intersect and pixels are arranged in a matrix; a power supply configured to generate first and second power supply voltages; a gamma-compensated voltage generator configured to generate gamma-compensated voltages based on the first and second power supply voltages; a data driver configured to convert data of an input image to the gamma-compensated voltages to output data voltages; and a multiplexer configured to distribute the data voltages output from the data driver to a plurality of data lines. The power supply varies at least one of the first and second power supply voltages at a given time interval.

In one or more embodiments, the given time interval is one frame, and the power supply alternately varies the first power supply voltage and the second power supply voltage at each interval of one frame.

In one or more embodiments, the given time interval is at least one horizontal period, and the power supply alternately varies the first power supply voltage and the second power supply voltage at each interval of the at least one horizontal period.

In one or more embodiments, the liquid-crystal display device further comprises a timing controller configured to output power supply data indicating voltage levels of the first and second power supply voltages and sends the data of the input image to the data driver.

In one or more embodiments, the power supply adjusts the first and second power supply voltages in response to the power supply data.

In one or more embodiments, the multiplexer comprises: a first multiplexer connected between a first output channel of the data driver and a plurality of odd-numbered data lines to distribute data voltages of a first polarity, which are input from the data driver in an Nth frame (N is a positive integer) or Nth i horizontal period (i is 1 or 2), to the odd-numbered data lines, and then distributes data voltages of a second polarity, which are input from the data driver in an (N+1)th frame or (N+1)th i horizontal period, to the odd-numbered data lines; and a second multiplexer connected between a second output channel of the data driver and a plurality of even-numbered data lines to distribute data voltages of the second polarity, which is input from the data driver in the Nth frame or Nth i horizontal period, to the even-numbered data lines, and then distributes data voltages of the first polarity, which are input from the data driver in the (N+1)th frame or (N+1)th i horizontal period, to the even-numbered data lines.

In one or more embodiments, the timing controller adjusts the first and second power supply voltages by multiplying the power supply data by a ratio (b/a) of a rate (a) of change of the voltage on the pixels connected to the odd-numbered data lines to a rate (b) of change of the voltage on the pixels connected to the even-numbered data lines.

In one or more embodiments, the liquid-crystal display device further includes a memory that stores the ratio (b/a), the timing controller configured to adjust the first and second power supply voltages based on the ratio (b/a) stored in the memory.

In one or more embodiments, the display panel is driven at a frame rate of 1 Hz to 30 Hz.

In yet another embodiment, the present disclosure provides a liquid-crystal display device comprising: a display panel on which data lines and gate lines intersect and pixels are arranged in a matrix; a power supply configured to generate first and second power supply voltages; a gamma-compensated voltage generator configured to generate positive and negative gamma-compensated voltages based on the first and second power supply voltages; a data driver configured to convert data of an input image to the positive and negative gamma-compensated voltages to output positive and negative data voltages; and a multiplexer configured to distribute the positive and negative data voltages output from the data driver to a plurality of data lines.

The power supply varies at least one of the first and second power supply voltages and at least one of the positive and negative data voltages with each frame or with each horizontal period.

In one or more embodiments, the power supply adjusts the first power supply voltage and the positive gamma-compensated voltage in an Nth frame (N is a positive integer) or Nth i horizontal period (i is 1 or 2), adjusts the second power supply voltage and the negative gamma-compensated voltage in an (N+1)th frame or (N+1)th i horizontal period, and varies the first power supply voltage and the positive gamma-compensated voltage alternately with the second power supply voltage and the negative gamma-compensated voltage.

In one or more embodiments, the positive data voltage supplied to the data lines varies with the first power supply voltage and the positive gamma-compensated voltage, and the negative data voltage supplied to the data lines varies with the second power supply voltage and the negative gamma-compensated voltage.

In one or more embodiments, the gamma-compensated voltage generator includes at least one voltage divider configured to generate the positive and negative gamma-compensated voltages as divided voltages between the first and the second power supply voltages.

In one or more embodiments, the multiplexer includes: a first multiplexer connected between a first output channel of the data driver and a plurality of odd-numbered data lines, the first multiplexer distributes the positive data voltages, which are input from the data driver in an Nth frame (where N is a positive integer) or Nth i horizontal period (where i is 1 or 2), to the odd-numbered data lines, and distributes the negative data voltages, which are input from the data driver in an (N+1)th frame or (N+1)th i horizontal period, to the odd-numbered data lines; and a second multiplexer connected between a second output channel of the data driver and a plurality of even-numbered data lines, the second multiplexer distributes the negative data voltages, which are input from the data driver in the Nth frame or Nth i horizontal period, to the even-numbered data lines, and distributes the positive data voltages, which are input from the data driver in the (N+1)th frame or (N+1)th i horizontal period, to the even-numbered data lines.

In one or more embodiments, the power supply varies the first and second power supply voltages based on a ratio (b/a) of a rate (a) of change of the voltage on the pixels connected to the odd-numbered data lines to a rate (b) of change of the voltage on the pixels connected to the even-numbered data lines.

In further embodiments, the present disclosure provides a driving method of a liquid-crystal display device, the method comprising: generating first and second power supply voltages; generating gamma-compensated voltages based on the first and second power supply voltages; converting data of an input image to the gamma-compensated voltages to output data voltages; distributing, by a multiplexer, the data voltages output from the data driver to a plurality of data lines; and varying at least one of the first and second power supply voltages with each frame or with each horizontal period.

In one or more embodiments, the power supply alternately varies the first power supply voltage and the second power supply voltage with each frame or with each horizontal period.

In one or more embodiments, distributing the data voltages includes: distributing, by a first multiplexer, data voltages of a first plurality, input in an Nth frame (where N is a positive integer) or Nth i horizontal period (where i is 1 or 2), to a plurality of odd-numbered data lines, and distributing, by the first multiplexer, data voltages of a second polarity, input in an (N+1)th frame or (N+1)th i horizontal period, to the odd-numbered data lines; and distributing, by a second multiplexer, data voltages of a second polarity, input in the Nth frame or Nth i horizontal period, to a plurality of even-numbered data lines, and distributing data voltages of the first polarity, input in the (N+1)th frame or (N+1)th i horizontal period, to the even-numbered data lines.

In one or more embodiments, the method further includes: generating power supply data indicating the voltage levels of the first and second power supply voltages; and adjusting the first and second power supply voltages by multiplying the power supply data by a ratio (b/a) of a rate (a) of change of the voltage on pixels connected to the odd-numbered data lines to a rate (b) of change of the voltage on pixels connected to the even-numbered data lines.

In one or more embodiments, the display panel is driven at a frame rate of 1 Hz to 30 Hz.

In one or more embodiments, generating the gamma-compensated voltages includes generating, by at least one voltage divider, the gamma-compensated voltages as divided voltages between the first and the second power supply voltages.

BRIEF DESCRIPTION OF THE SEVERAL VIEWS OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings.

DETAILED DESCRIPTION

Figure 1:
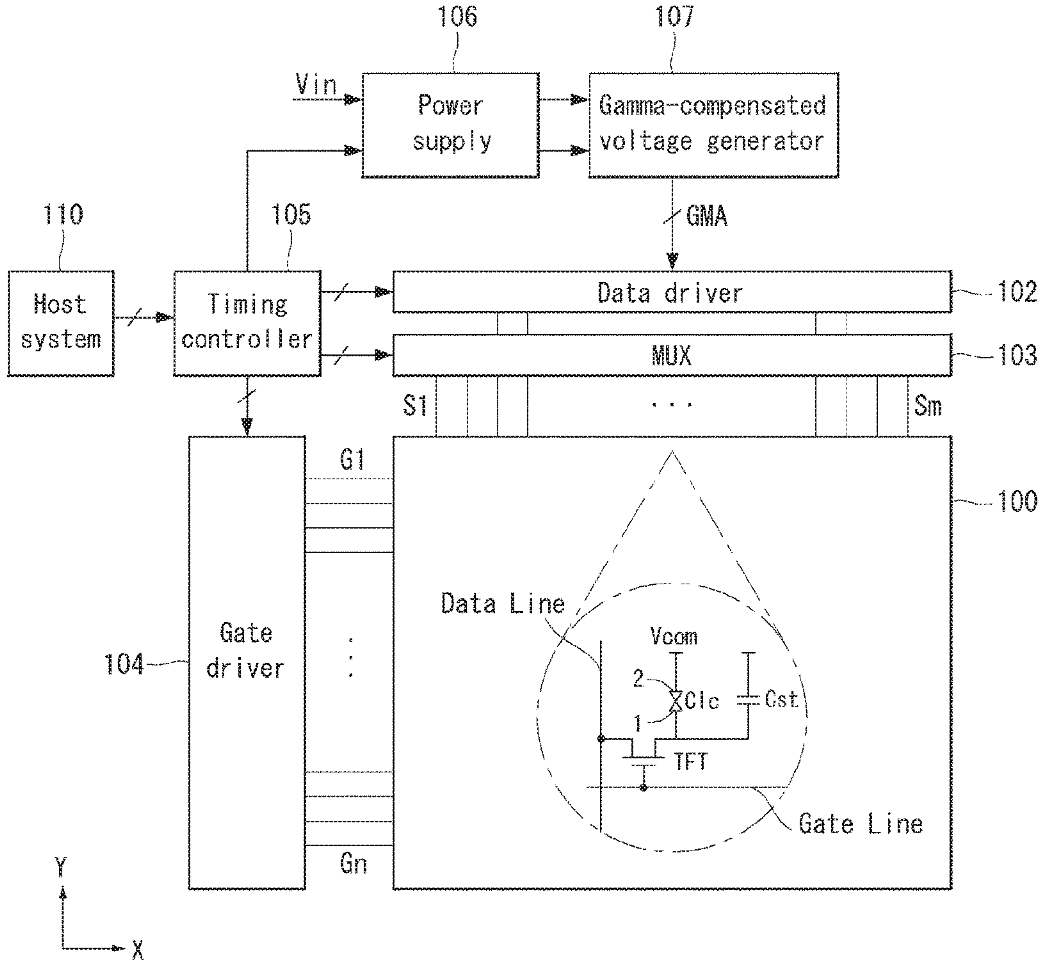
FIG. 1 is a block diagram showing a liquid-crystal display device according to an exemplary embodiment of the present disclosure.

Reference will now be made in detail to various embodiments of the present disclosure, examples of which are illustrated in the accompanying drawings. However, the present disclosure is not limited to embodiments specifically described below, and may be implemented in various forms. These embodiments are provided so that the present disclosure will be described more completely, and will fully convey the scope of the present disclosure to those skilled in the art to which the present disclosure pertains. Particular features of the present disclosure can be defined by the scope of the claims.

Shapes, sizes, ratios, angles, number, and the like illustrated in the drawings for describing embodiments of the present disclosure are merely exemplary, and the present disclosure is not limited thereto unless specified as such. Like reference numerals designate like elements throughout. In the following description, when a detailed description of certain functions or configurations related to this document may unnecessarily cloud the gist of the disclosure, then such description may be omitted.

In the present disclosure, the terms “include”, “have”, “comprised of”, etc., are used in an inclusive sense and other components may be added unless a specifically limiting terms such as “only” is used. A singular expression can include a plural expression as long as it does not have a clearly different meaning in context, such as by use of terms which specifically limit the expression to the singular form.

In the explanation of components, even if there is no separate description, it is interpreted as including margins of error or an error range.

In the description of positional relationships, when a structure is described as being positioned “on” or “above”, “under” or “below”, “next to” another structure, this description should be construed as including a case in which the structures directly contact each other as well as a case in which a third structure is disposed therebetween.

The terms “first”, “second”, etc., may be used to describe various components, but the components are not limited by such terms. The terms are used only for the purpose of distinguishing one component from other components. For example, a first component may be designated as a second component, and vice versa, without departing from the scope of the present disclosure.

The features of various embodiments of the present disclosure can be partially combined or entirely combined with each other, and can be technically interlocking-driven in various ways. The embodiments can be independently implemented, or can be implemented in conjunction with each other.

Reference will now be made in detail to embodiments of the disclosure, examples of which are illustrated in the accompanying drawings. Wherever possible or convenient for explanation, the same reference numbers will be used throughout the drawings to refer to the same or like parts. Detailed descriptions of known arts will be omitted if such may mislead the embodiments of the disclosure.

A display device of this disclosure may be implemented as a flat panel display, such as a liquid-crystal display (LCD) or an organic light emitting display (OLED). Although the following embodiment will be described by taking a liquid-crystal display as an example of the flat panel display, the present disclosure is not limited thereto. For example, the present disclosure is applicable to any display device that has a multiplexer between a data driver and data lines and utilizes gamma-compensated voltage for driving the data driver.

Figure 2:
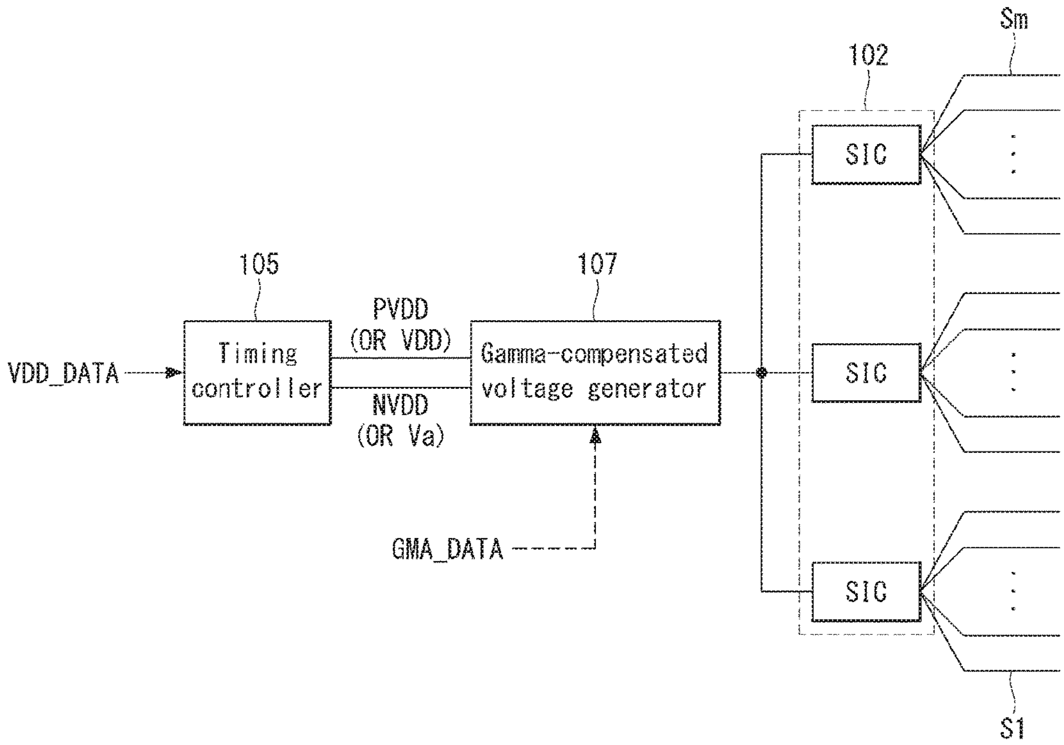
FIG. 2 is a block diagram showing an example in which gamma-compensated voltages are supplied to source drive ICs.

Referring to FIGS. 1 and 2, in one or more embodiments, a display device of this disclosure comprises a display panel 100 with a pixel array and a display panel drive circuit for writing data of an input image to the display panel 100. The display panel drive circuit comprises a data driver 102, a gate driver 104, and a timing controller 105. The display device further comprises a power supply 106 and a gamma-compensated voltage generator 107.

The display panel 100 comprises upper and lower substrates facing each other, with a liquid crystal layer interposed between them. A pixel array for displaying an input image is formed in the active area of the display panel 100. The pixel array comprises pixels arranged in a matrix by the intersections of data lines S1 to Sm and gate lines G1 to Gn.

The lower substrate of the display panel 100 comprises data lines S1 to Sm, gate lines G1 to Gn, TFTs, pixel electrodes 1 connected to the TFTs, and storage capacitors Cst connected to the pixel electrodes 1.

Each pixel may comprise a red (R) subpixel, a green (G) subpixel, and a blue (B) subpixel to represent colors. Also, each pixel may further comprise a white (W) subpixel. By using a rendering algorithm in a PenTile pixel array, one pixel may be implemented with two subpixels. The pixels adjust the amount of light transmission by using liquid crystal molecules, which are driven by the voltage difference between the pixel electrodes 1 charged with data voltages through the TFTs and a common electrode 2 to which common voltage Vcom is applied.

The TFTs formed on the lower substrate of the display panel 100 may be implemented as amorphous Si (a-Si) TFTs, low temperature polysilicon (LTPS) TFTs, oxide TFTs, etc. The TFTs are formed at the intersections of the data lines S1 to Sm and the gate lines G1 to Gn. The TFTs feed data voltages from the data lines to the pixel electrodes 1 in response to a gate pulse.

A black matrix BM and a color filter array consisting of color filters are formed on the upper substrate of the display panel 100. In the case of vertical electric field displays such as TN (Twisted Nematic) displays and VA (Vertical Alignment) displays, the common electrode 2 is formed on the upper substrate. In the case of horizontal electric field displays such as in-plane switching (IPS) displays and fringe field switching (FFS) displays, the common electrode 2, together with the pixel electrodes 1, is formed on the lower substrate. Polarizers are attached to the upper and lower substrates of the display panel 100, and alignment layers for setting a pre-tilt angle of liquid crystals are then formed.

On-cell type touch sensors or add-on type touch sensors may be disposed on the display panel 100. To drive such touch sensors, a touch sensor driver (not shown) may be added to a drive circuit for the liquid-crystal display device. The touch sensor driver receives an output signal from a touch sensor, creates the coordinates of each touch input, and sends them to a host system 110.

The display device of the various embodiments provided by this disclosure may be implemented as any type of display device, including a transmissive liquid crystal display, a semi-transmissive liquid crystal display, and a reflective liquid crystal display. The transmissive liquid crystal display and the semi-transmissive liquid crystal display require a backlight unit. The backlight unit is disposed under the display panel 100 to evenly illuminate the display panel 100. The backlight unit may be implemented as a direct-type backlight unit or an edge-type backlight unit. A self-luminous device, for example, an OLED display, requires no backlight unit.

The power supply 106 may be implemented as a power module integrated circuit (PMIC). The power supply 106 generates direct-current driving voltage required for driving the display panel 100 by adjusting direct-current input voltage Vin using a DC-DC converter, a charge pump, a regulator, etc. The power supply 106 generates a plurality of voltages, e.g., PVDD (or VDD), NVDD (or Va), VGH, VGL, Vcom, etc. PVDD (or VDD) and NVDD (or Va) are high-potential power supply voltage (PVDD or VDD) and low-potential power supply voltage (NVDD or Va), respectively, that are applied to the gamma-compensated voltage generator 107. PVDD (or VDD) and NVDD (or Va) are reference power for gamma-compensated voltages GMA output from the gamma-compensated voltage generator 107. VGH and VGL are gate-high voltage VGH and gate-low-voltage that are applied to the gate driver 104. The gate-high voltage VGH is a high-level voltage for gate pulses, and the gate-low voltage VGL is a low-level voltage for gate pulses.

The power supply 106 varies output voltage levels of PVDD (or VDD) and NVDD (or Va) at given time intervals, in response to power supply data VDD_DATA from the timing controller 105. The power supply data VDD_DATA is digital data that indicates the voltage levels of PVDD (or VDD) and NVDD (or Va). The voltages levels of PVDD (or VDD) and NVDD (or Va) may be varied according to the power supply data VDD_DATA. To compensate for brightness asymmetry between pixels, the voltage levels of PVDD (or VDD) and NVDD (or Va) may be changed at given time intervals. The time intervals are synchronous with intervals of data voltage polarity reversal. In the column inversion method, the interval length may be 1 frame.

In the dot inversion or line inversion method, the interval length may be 1 horizontal period or 2 horizontal periods. In this case, a suitable voltage variation range for PVDD (or VDD) and NVDD (or Va) is 0.1 V or less. This facilitates fine adjusting of the brightness to a level at which the user cannot perceive a brightness change with the gray level of data and flicker is not noticeable.

The gamma-compensated voltage generator 107 generates gamma-compensated voltages GMA by dividing voltages between PVDD and NVDD or between VDD and Va. The gamma-compensated voltages GMA output from the gamma-compensated voltage generator 107 are supplied to the source drive ICs SIC of the data driver 102. The gamma-compensated voltage generator 107 may be implemented as a programmable gamma IC that adjusts gamma tap voltages (GMA_A to GMA_D of FIGS. 4 to 6) according to gamma data GMA_DATA from the timing controller 105. The gamma data GMA_DATA is digital data that indicates the voltage levels of the gamma tap voltages GMA_A to GMA_D. The gamma-compensated voltage generator 107 may be integrated within the source drive ICs SIC.

A multiplexer (MUX) 103 may be formed in the display panel 100. The multiplexer 103 is disposed between the data driver 102 and the data lines S1 to Sm.

Output channels of the data driver 102 are connected to the data lines S1 to Sm via the multiplexer 103. The data driver 102 receives data of an input image from the timing controller 105. The data driver 102 converts digital video data of an input image to gamma-compensated voltages to output data voltages under control of the timing controller 105. The data voltages are fed to the data lines S1 to Sm via the multiplexer 103. The data driver 102 may comprise one or more source drive ICs (SIC), as shown in FIG. 2.

The multiplexer 103 is disposed between the data driver 102 and the data lines S1 to Sm. The multiplexer 103 distributes the data voltages input from the data driver 102 to the data lines S1 to Sm. In case of a 1-to-3 multiplexer, the multiplexer 103 supplies data voltages input through one output channel of the data driver 102 to three data lines in a time-division manner. Accordingly, the number of ICs in the data driver 102 required to drive the display panel 100 can be reduced to ⅓ by using the 1-to-3 multiplexer. Other ratios of multiplexers, e.g., 1-to-2, 1-to-4, etc., may be utilized in various embodiments of the present disclosure.

The gate driver 104 feeds a gate pulse to the gate lines G1 to Gn under control of the timing controller 105. The gate pulse is synchronized with the data voltages fed to the data lines S1 to Sm.

The timing controller 105 transmits digital video data of an input image received from the host system 110 to the data driver 102. The timing controller 105 receives timing signals synchronized with the input image data from the host system 110. The timing signals comprise a vertical synchronization signal Vsync, a horizontal synchronization signal Hsync, a data enable signal DE, a main clock DCLK, etc. The timing controller 105 controls the operation timings of the data driver 102, gate driver 104, and multiplexer 103 based on the timing signals Vsync, Hsync, DE, and DCLK. The timing controller 105 may convert RGB data of an input image to RGBW data using, e.g., any known white gain calculation algorithm and transmit it to the data driver 102.

A gate timing control signal is generated by the timing controller 105 to control the operation timing of the gate driver 104. The gate timing control signal comprises a gate start pulse GSP, a gate shift clock GSC, and a gate output enable signal GOE. The gate start pulse GSP controls the operation start timing of the gate driver 104. The gate shift clock GSC is a clock signal for shifting the gate start pulse GSP. The gate output enable signal GOE controls the output timing of the gate driver 104.

A source timing control signal is generated by the timing controller 105 to control the operation timing of the data driver 102. The source timing control signal comprises a source start pulse SSP, a source sampling clock SSC, a polarity control signal POL, and a source output enable signal SOE. The source start pulse SSP controls the start timing of data sampling of the data driver 102. The source sampling clock SSC is a clock signal that controls data sampling timing. The polarity control signal POL controls the polarity of data voltages supplied from the data driver 102. The source output enable signal SOE controls charge sharing timing and data output timing.

The timing controller 105 generates MUX control signals for controlling the on/off timings of switch elements of the multiplexer 103. In the drawings, e.g., as used in FIG. 10, MUX1 to MUX3 denote MUX control signals.

Figure 8:
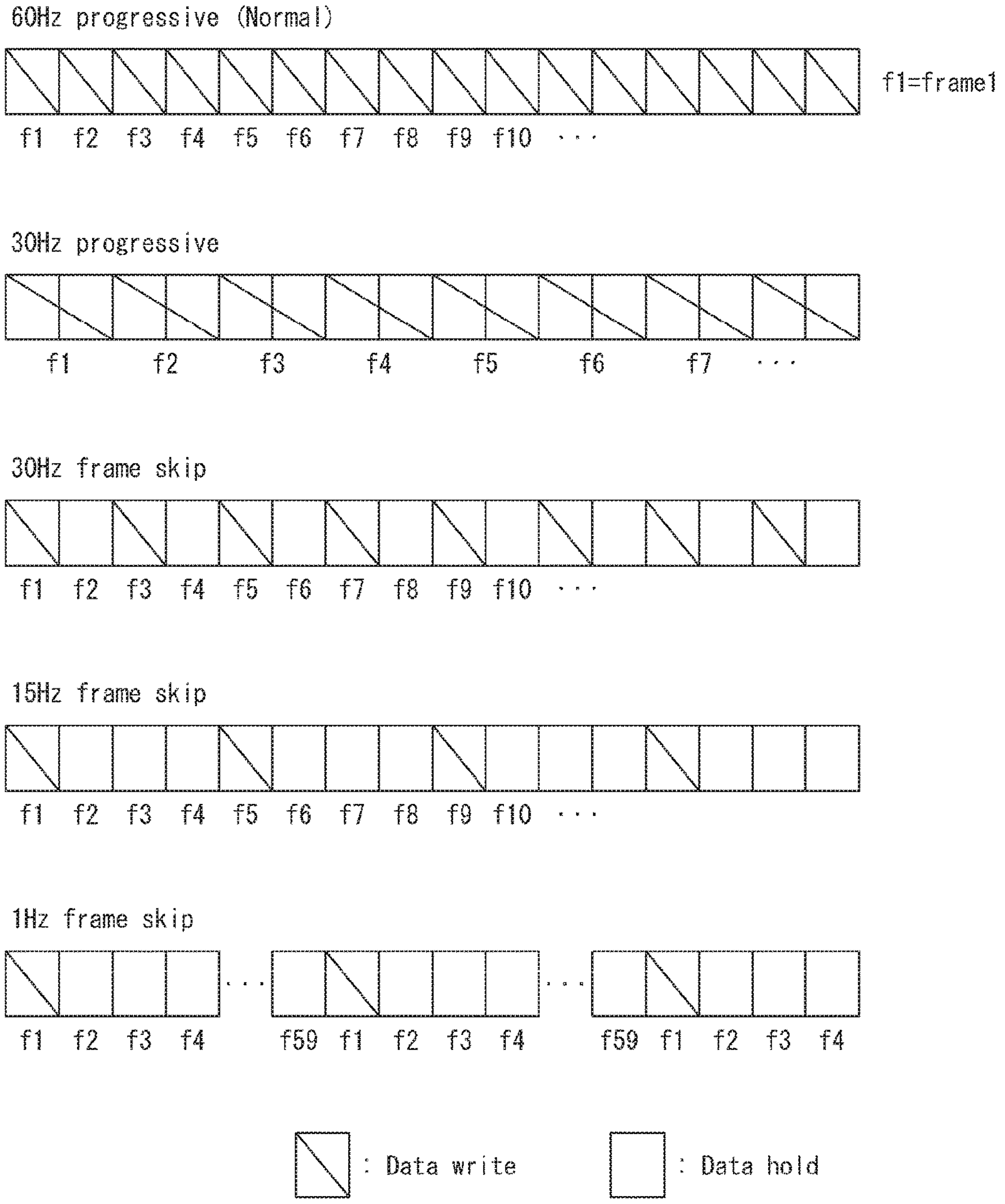
FIG. 8 is a timing diagram showing frame rates in various slow driving modes.

In a normal driving mode, the timing controller 105 increases the frame rate to an input frame rate×N (N is a positive integer of 2 or more) Hz of the input image to control the display panel drivers 102, and 104 at the frame rate multiplied by N times in the normal driving mode. The input frame rate is 60 Hz in the NTSC (National Television Standards Committee) system and 50 Hz in the PAL (Phase-Alternating Line) system. When there is little variation in data of an input image or the input image is a still image, the timing controller 105 may decrease the frequency of update of data written to the pixels by driving the display panel drive circuit at a slow rate, in order to reduce power consumption. For example, in the slow driving mode, the timing controller 105 may decrease the frame rate to 30 Hz or less, as shown in FIG. 8. A frame rate in the slow driving mode may be called a low refresh rate (LLR).

The timing controller 105 may control the timings to vary PVDD (or VDD) and NVDD (or Va) by determining a horizontal period, a frame period, etc., based on the timing signals from the host system 110 and varying power supply data VDD_DATA at given time intervals. Moreover, the timing controller 105 may control the timings to vary the gamma tap voltages GMA_A to GMA_D by varying the gamma data GMA DATA at given time intervals.

The host system 110 may be implemented as any one of the following: a television system, a home theater system, a set-top box, a navigation system, a DVD player, a Blu-ray player, a personal computer PC, and a phone system. Moreover, the host system 110 may be a system that controls an entire mobile device or wearable device. The host system 110 scales digital video data RGB of an input image to the resolution of the display panel 100. The host system 110 sends timing signals Vsync, Hsync, DE, and CLK to the timing controller 105, along with the digital video data RGB of the input image. The host system 110 executes an application program associated with the coordinate information of a touch input from the touch sensor driver.

Figure 3:
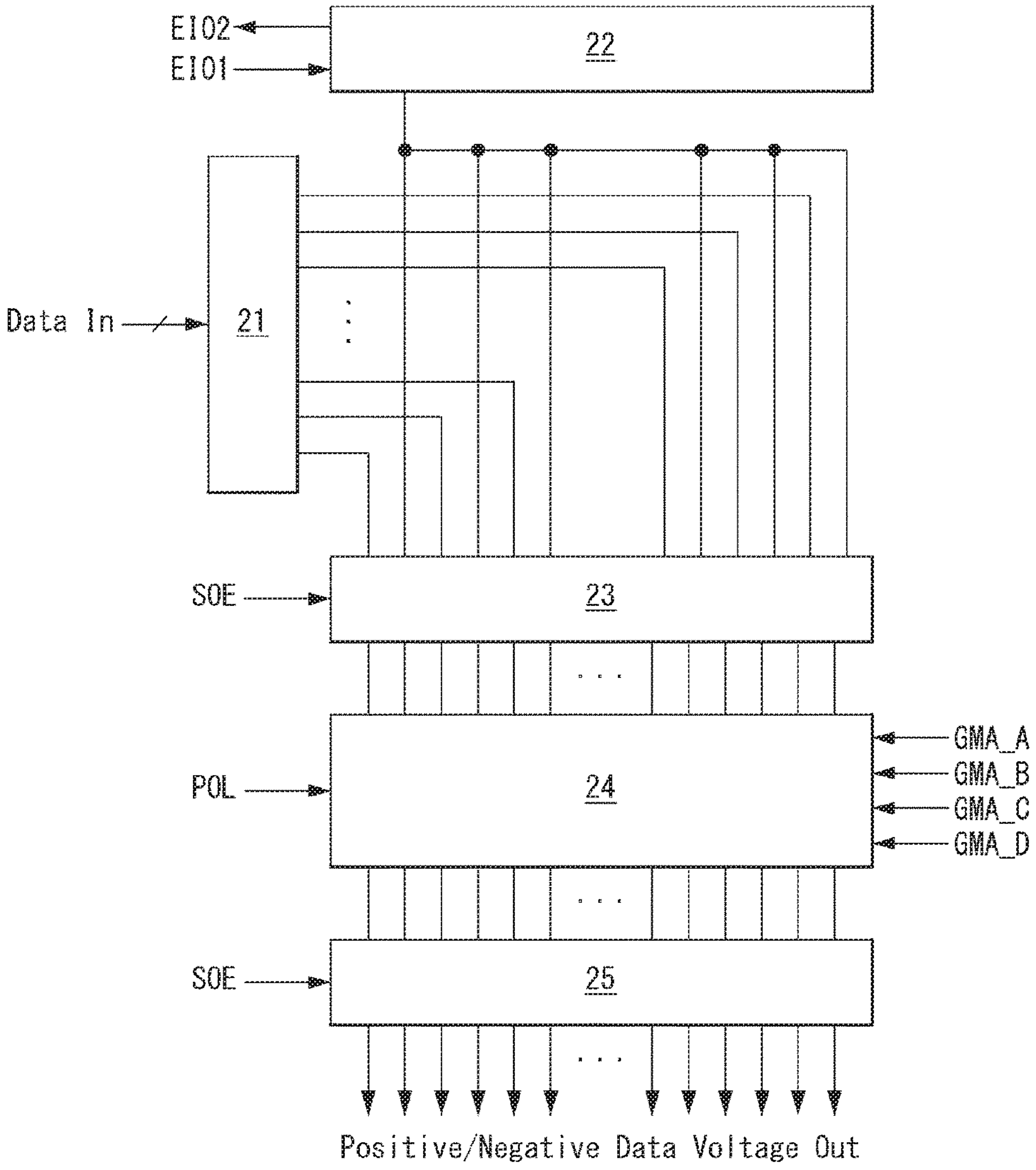
FIG. 3 is a block diagram showing in detail a source drive IC.

FIG. 3 is a block diagram showing an internal circuit configuration of a source drive IC SIC.

Referring to FIG. 3, the source drive IC SIC comprises a data register 21, a shift register 22, a latch 23, digital-to-analog converters (hereinafter, "DACs") 24, and an output circuit 25.

The data register 21 converts digital video data received from the timing controller 105 to parallel data and supplies it to the latch 23. The shift register 22 sequentially generates sampling clocks by shifting the source start pulse SSP in synchronization with the source sampling clock SSC. In FIG. 3, "EIO1" refers to the source start pulse SSP or a carry signal received from the source drive IC of the previous stage. "EIO2" refers to a carry signal output from the shift register 22 that is delivered to the source drive IC of the next stage.

The latch 23 samples the digital video data input from the data register 21 based on the sampling clocks sequentially input from the shift register 22, and outputs data simultaneously with the latches of other source drive ICs, in response to a low logic level of the source output enable signal SOE.

Figure 6:
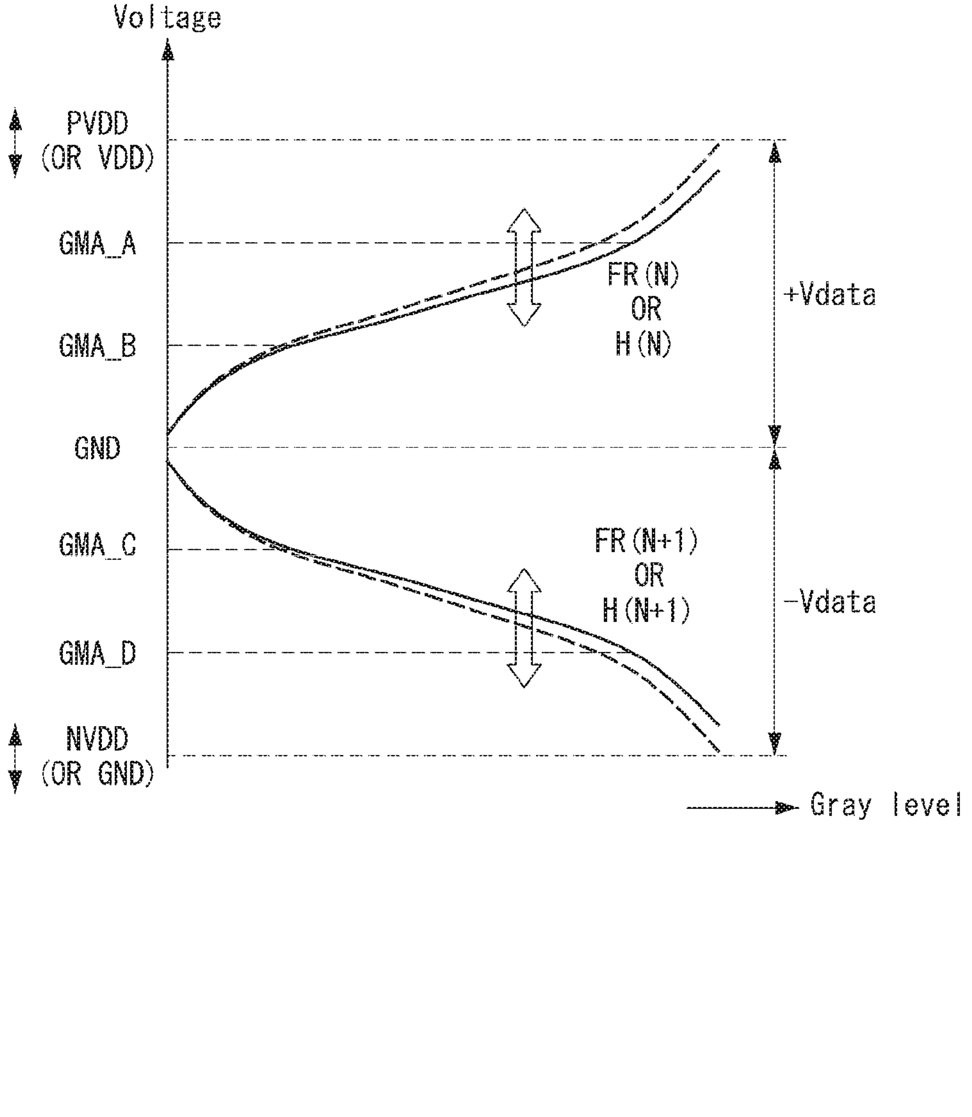
FIG. 6 is a plot showing gamma curves that vary at given time intervals.

The DACs 24 convert the digital video data input from the latch 23 to gamma-compensated voltages GMA_A to GMA_D to output data voltages. The data voltages are divided into positive data voltages +Vdata and negative data voltages −Vdata, as shown in FIG. 6. The positive data voltages +Vdata are voltages that are higher than a common voltage Vcom. The negative data voltages −Vdata are voltages that are lower than the common voltage Vcom. The negative data voltages −Vdata are not necessarily negative since they only need to be lower than the common voltage Vcom. For example, when Vcom is 5 V, the negative data voltages may be equal to or higher than 0 V and lower than 5 V, and when Vcom is GND, the negative data voltages may be lower than GND and equal to or higher than −5 V.

A level shifter may be disposed between the latch 23 and the DACs 24. The level shifter adjusts an output voltage of the latch 23 to an operating voltage of the DACs 24.

Figure 9A:
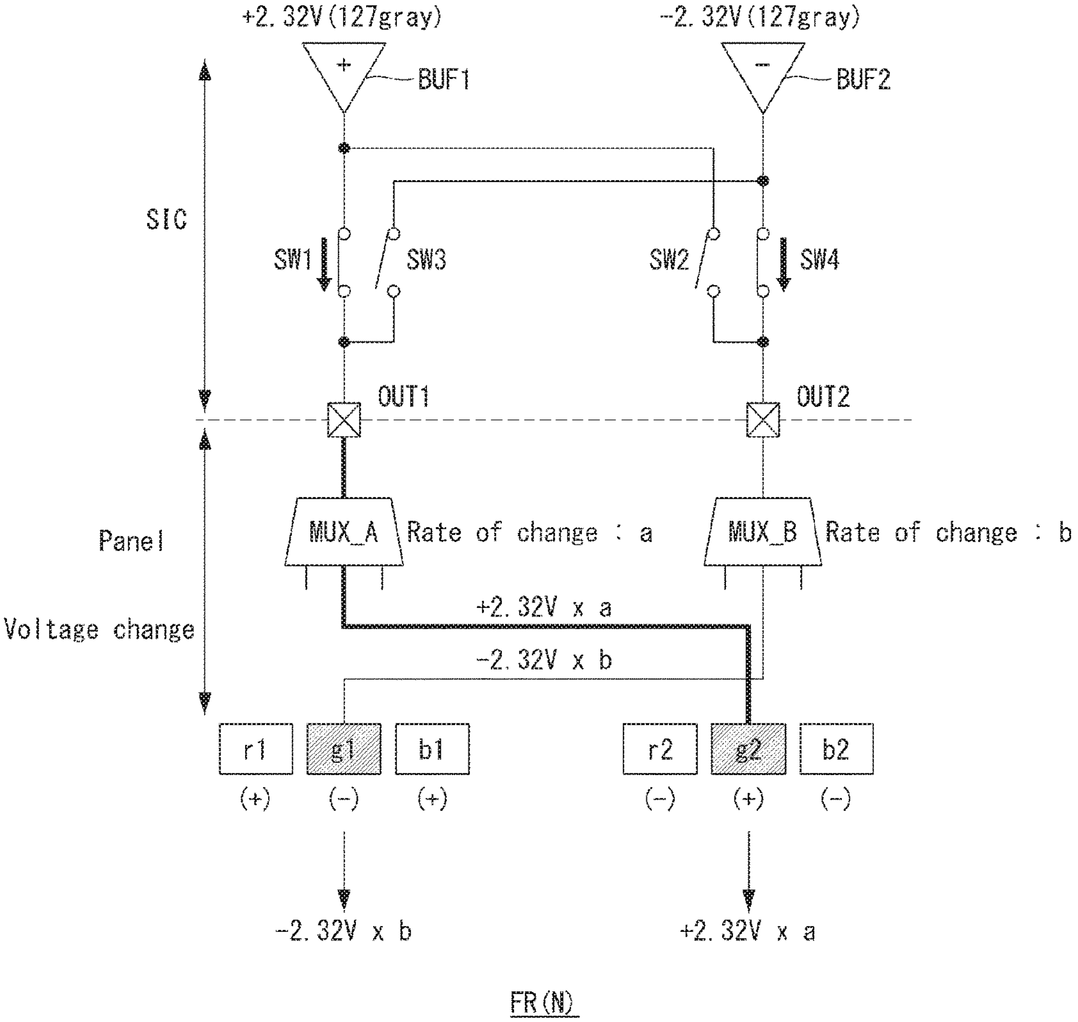
FIGS. 9A and 9B are schematic diagrams showing connections among a source drive IC, multiplexers, and pixels.
Figure 9B:
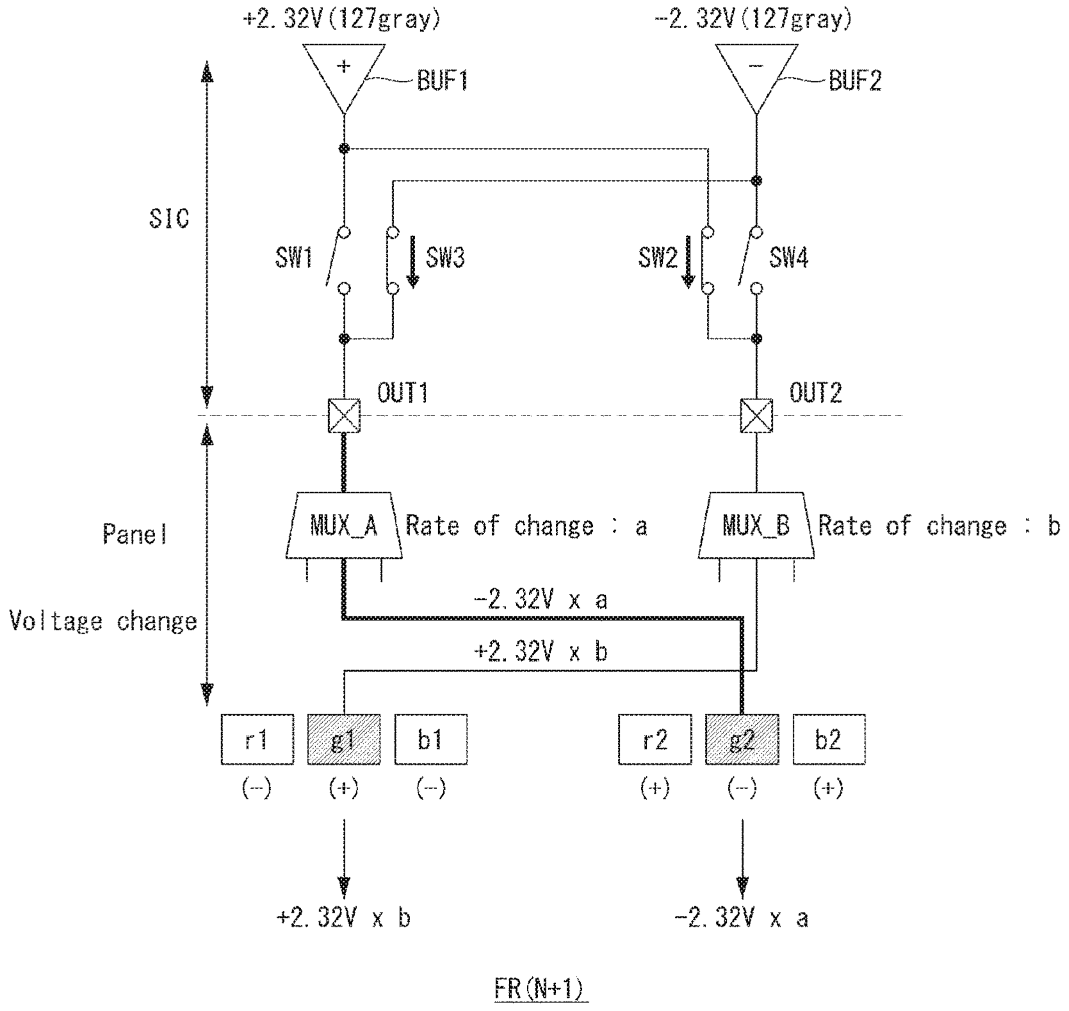

The DACs 24 each comprise a P decoder that outputs positive data voltage through a first buffer BUF1 shown in FIGS. 9A and 9B, and an N decoder that outputs negative data voltage through a second buffer BUF2 shown in FIGS. 9A and 9B. Outputs of the P decoder and N decoder are output to multiplexers MUX_A and MUX_B through switches SW1 to SW4 shown in FIGS. 9A and 9B. The switches SW1 to SW4 are turned on/off in response to a polarity control signal POL.

The output circuit 25 performs charge sharing in response to a high logic level of the source output enable signal SOE, and outputs data voltages to the data lines S1 to Sm through the output buffers BUF1 and BUF2 in response to a low logic level of the source output enable signal SOE.

Figure 4:
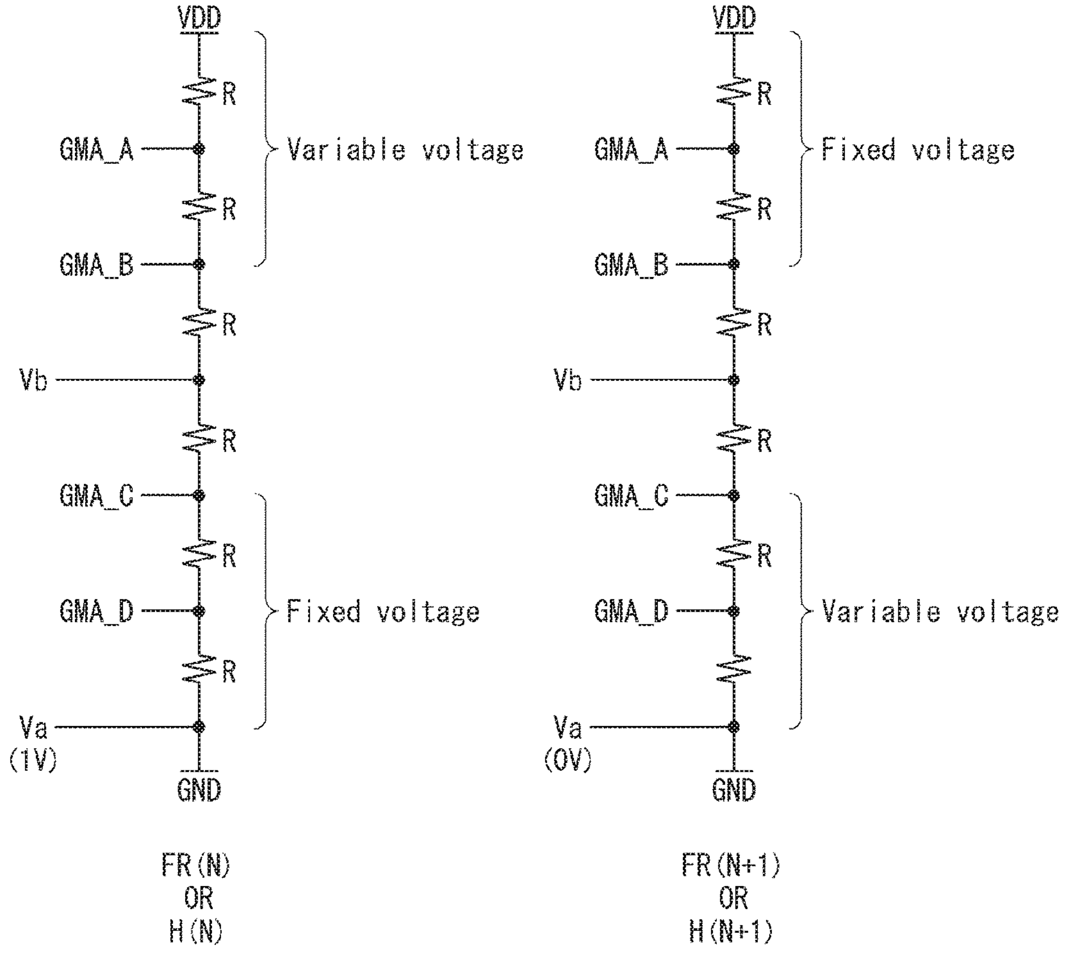
FIG. 4 is a circuit diagram showing gamma-compensated voltages divided between VDD and Va.

FIG. 4 is a view showing gamma-compensated voltages divided between VDD and GND.

Referring to FIG. 4, a voltage-dividing circuit of the gamma-compensated voltage generator 107 generates gamma tap voltages GMA_A to GMA_D by dividing voltages between VDD and GND using resistors R. The gamma tap voltages GMA_A to GMA_D are gamma-compensated voltages that are supplied to the source drive ICs SIC. The positive gamma-compensated voltages GMA_A and GMA_B are gamma-compensated voltages that are between VDD and Vb. GMA_A is a voltage that is higher than GMA_B.

The negative gamma-compensated voltages GMA_C and GMA_D are gamma-compensated voltages that are between Vb and Va. GMA_C is a voltage that is higher than GMA_D.

Vb is a voltage that is between GMA_B and GMA_C. Va is a voltage that is between GMA_D and GND.

In embodiments of the present disclosure, VDD is varied at given time intervals, or VDD and Va each are varied at given time intervals, in order to compensate for brightness asymmetry in the display device. In the former case, VDD is varied when a positive data voltage is applied to either odd-numbered data lines or even-numbered data lines. In the latter case, VDD is varied when a positive data voltage is applied to either odd-numbered data lines or even-numbered data lines, and Va is varied when a negative data voltage is applied.

VDD and Va are alternately varied at given time intervals under control of the timing controller 105. In the example of FIG. 4, VDD may change to a voltage higher or lower than VDD_default during an Nth frame FR(N) (N is a positive integer), and Va may be Va_default. VDD_default and Va_default are default or "normal" values of VDD and Va, respectively, before being varied as described herein. Va may change to a voltage higher or lower than Va_default during an (N+1)th frame FR(N+1), and VDD may be VDD_default. VDD_default may be 10 V and Va_default may be a voltage between GMA_D and GND (=0 V), but they are not limited to these.

In dot inversion or line inversion, VDD may go above VDD_default in an Nth i horizontal period (i is 1 or 2) and go down to VDD_default in an (N+1)th i horizontal period. Va may be Va_default in the Nth i horizontal period and go down to Va_default in the (N+1)th i horizontal period.

When VDD is varied, the gamma-compensated voltages GMA_A and GMA_B change with VDD because GMA_A and GMA_B are connected to VDD through the resistors R. When Va is varied, the gamma-compensated voltages GMA_C and GMA_D change with Va because GMA_C and GMA_D are connected to Va through the resistors R. For example, when VDD increases by 5%, GMA_A and GMA_B may increase by approximately 1%, and when Va decreases by 0.5%, GMA_C and GMA_D may decrease by approximately 1%. Vb, which is between GMA_B and GMA_C, should not change even if VDD or GND is varied. To this end, the voltage Vb may be applied to a Vb node.

Figure 5:
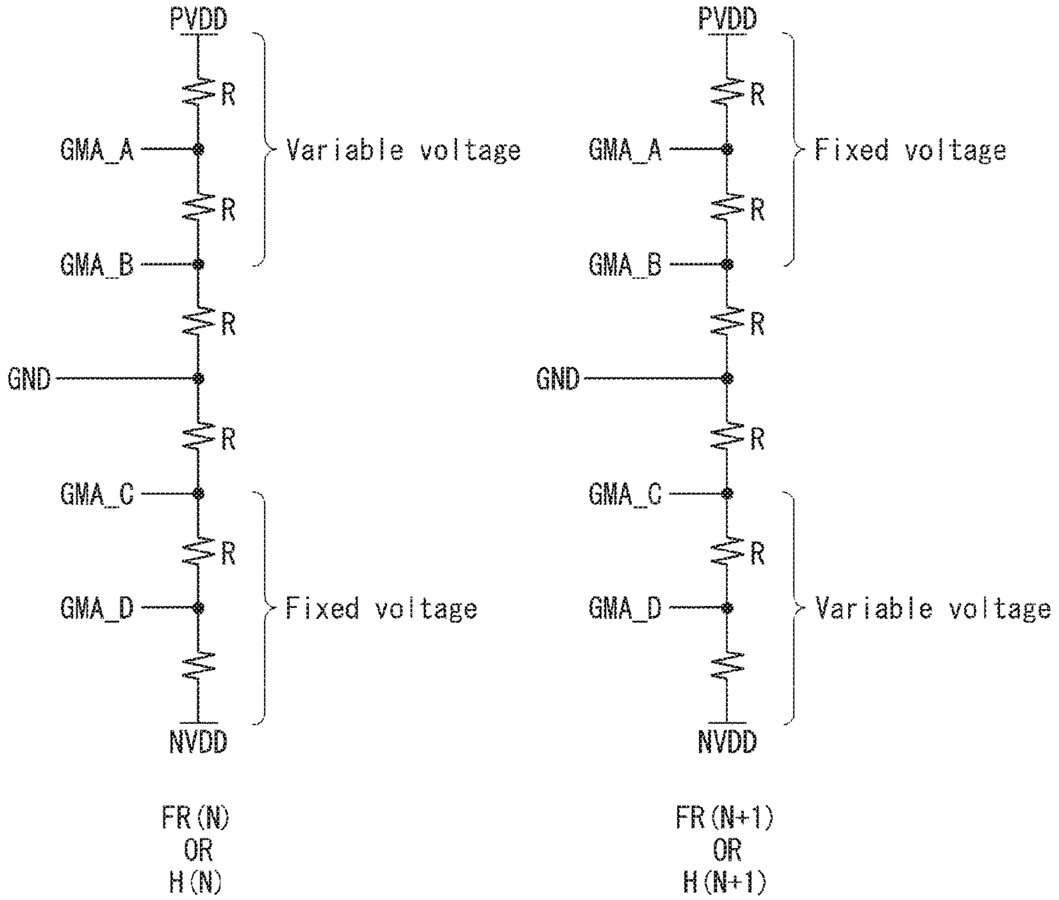
FIG. 5 is a circuit diagram showing gamma-compensated voltages divided between PVDD and NVDD.

FIG. 5 is a view showing gamma-compensated voltages divided between PVDD and NVDD.

Referring to FIG. 5, a voltage-dividing circuit of the gamma-compensated voltage generator 107 generates gamma-compensated voltages GMA_A to GMA_D by dividing voltages between PVDD and NVDD using resistors R. GMA_A and GMA_B are gamma-compensated voltages that are between VDD and GND. GMA_A is a voltage that is higher than GMA_B. GMA_C and GMA_D are gamma-compensated voltages that are between GND and NVDD. GMA_C is a voltage that is higher than GMA_D. GND is a ground voltage between GMA_B and GMA_C.

PVDD and NVDD are alternately varied at given time intervals under control of the timing controller 105. In the example of FIG. 5, PVDD may increase to a voltage higher than PVDD_default during the Nth frame FR(N), and NVDD may be NVDD_default. NVDD may decrease to a voltage lower than NVDD_default during the (N+1)th frame FR(N+1), and PVDD may be PVDD_default. Alternatively, PVDD may change to a voltage lower than PVDD_default during the Nth frame FR(N) and NVDD may change to a voltage higher than NVDD_default during the (N+1)th frame FR(N+1). PVDD_default may be +5 V and NVDD_default may be −5 V, but they are not limited to these.

In dot inversion or line inversion, PVDD may go above or below PVDD_default in an Nth i horizontal period and may be at PVDD_default in the (N+1)th i horizontal period. NVDD may be NVDD_default in the Nth i horizontal period and go above or below NVDD_default in the (N+1)th i horizontal period.

When PVDD is varied, GMA_A and GMA_B are varied. When NVDD is varied, GMA_C and GMA_D are varied. For example, when PVDD increases by 0.5%, GMA_A and GMA_B may increase by approximately 1%, and when NVDD decreases by 0.5%, GMA_C and GMA_D may decrease by approximately 1%. GND should not change even if VDD or GND is varied. To this end, the ground voltage GND may be applied to a GND node.

In the present disclosure, the positive gamma tap voltages GMA_A and GMA_B may be varied at given time intervals, along with PVDD (or VDD), by using power supply data VDD_DATA and gamma data GMA_DATA. Moreover, in the present disclosure, the negative gamma tap voltages GMA_C and GMA_D may be varied at given time intervals, along with NVDD (or Va), by using the power supply data VDD_DATA and the gamma data GMA_DATA.

FIG. 6 is a view showing gamma curves that vary at given time intervals. In FIG. 6, the x axis denotes gray level, and the y axis denotes voltage.

Referring to FIG. 6, the present disclosure presents an example in which PVDD (or VDD) and NVDD (or Va) are alternately varied at given time intervals. For example, the gamma curve of positive data voltage +Vdata goes up with increasing PVDD (or VDD) during the Nth frame FR(N). The gamma curve of negative data voltage −Vdata goes down with decreasing NVDD (or Va) during the (N+1)th frame FR(N+1).

In the case of dot inversion or line inversion, the gamma curve of positive data voltage +Vdata goes up with increasing PVDD (or VDD) during the Nth i horizontal period. The gamma curve of negative data voltage −Vdata goes down with decreasing NVDD (or Va) during the (N+1)th i horizontal period.

Figure 7:
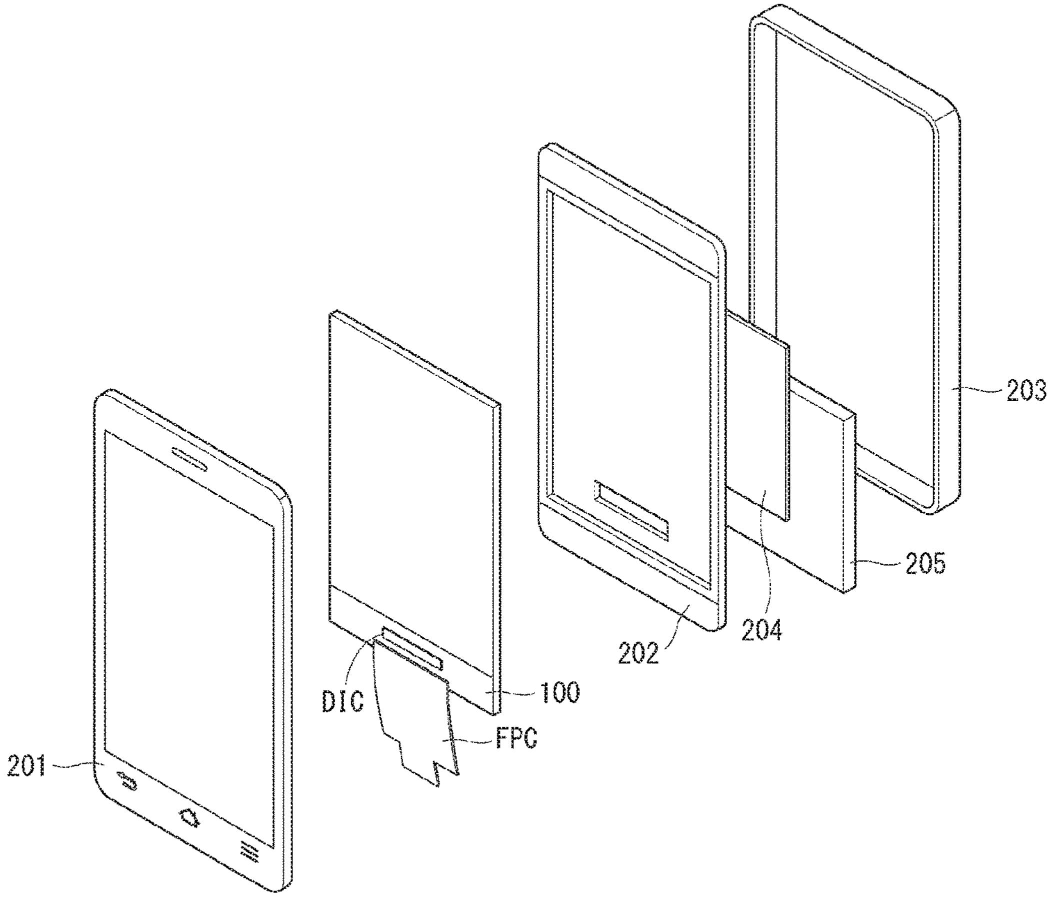
FIG. 7 is an exploded perspective view schematically showing an example of a mobile terminal.

In the case of a mobile device or wearable device, the data driver 102, timing controller 105, power supply 106, gamma-compensated voltage generator 107, etc., may be integrated in a single drive IC (DIC) chip, as shown in FIG. 7.

FIG. 7 is an exploded perspective view schematically showing an example of a mobile terminal. It should be noted that, while the mobile terminal is illustrated as having a bar-shaped full touchscreen structure, the present disclosure is not limited to such structures.

Referring to FIG. 7, the mobile terminal comprises a display device, a front cover 201, a back cover 203, a mid frame 202, a mainboard 204, a battery 205, etc. As used herein, the "cover" may represent a case or a housing.

The display device is a flat panel display such as a liquid-crystal display LCD or an OLED display. FIGS. 1 and 2 depict an example of such a display device.

A drive IC DIC is connected to the mainboard 204 through a flexible printed circuit FPC. The drive IC DIC writes image data received through the mainboard 204 to the pixels on the display panel 100. The flexible printed circuit may be used as a flexible printed circuit board (FPCB).

The front cover 201 comprises tempered glass that covers the display panel 100. The front cover 201 covers the front of the mobile terminal. The screen of the display panel 100 is exposed to the front of the mobile terminal. A front camera and various types of sensors may be placed on the front of the mobile terminal. A rear camera and various types of sensors may be placed on the back of the mobile terminal. These sensors comprise a variety of sensors that can be adapted to the mobile terminal, including, for example, a proximity sensor, a gyroscope sensor, a geomagnetic sensor, a motion sensor, an illumination sensor, an RGB sensor, a Hall sensor, a temperature/humidity sensor, a heartbeat sensor, a fingerprint sensor, etc.

The display device, mid frame 202, mainboard 204, battery 205, etc., are placed in the space between the front cover 201 and the back cover 203. The mid frame 202 supports the display panel 100, and spatially separates the display panel 100 and the mainboard 204 from each other. Further, A/V (audio/video) inputs, a user input section, a speaker, a microphone, etc., may be installed on the front cover 201 and the back cover 203. The A/V inputs, user input section, speaker, and microphone are connected to the mainboard 204. The user input section may be configured with a touch keypad, a dome switch, a touch pad, a jog wheel, a jog switch, etc.

The mainboard 204 comprises a display device, a wireless communication module, a short-range communication module, a mobile communication module, a broadcast receiving module, A/V inputs, a GPS (global positioning system) module, a power circuit, etc. The user input section, speaker, microphone, battery 205, etc., are connected to the mainboard 204. The power circuit eliminates noise from the voltage of the battery 205 and supplies the resulting voltage to the circuit in the mainboard 104 and the power supply 106 of the display panel drive circuit after removing noise. The mainboard 204 of the mobile terminal may comprise an application processor (AP). The AP sends and receives image data to and from the drive IC DIC of the display device via a mobile industry processor interface (MIPI).

FIG. 8 is a view showing frame rates in slow driving mode.

Referring to FIG. 8, in slow driving mode, the timing controller 105 may decrease the frame rate to a frequency of 30 Hz or less, which is lower compared to that in normal driving mode, so that the frame period for writing data to the pixels can be reduced and the hold time for the pixels can be lengthened.

Brightness may not be the same when data voltages of the same gray level are applied to positive pixels and negative pixels. The negative pixels are pixels to which negative data voltages are applied. The polarity of the pixels is not fixed because the polarity of data voltages applied to the pixels is reversed with every frame.

When the frame rate is decreased in slow driving mode, a degradation in image quality may be observed, which is not seen at high frame rates in normal driving mode. Typical examples of image quality degradation in slow driving mode include vertical crosstalk, flicker, and afterimage. Vertical crosstalk is caused by the off current Ioff of transistors—especially, massive transistors constituting a multiplexer. Flicker occurs due to the off current Ioff of transistors, visibility caused by frequency, severe brightness asymmetry, etc. Afterimage occurs due to accumulation of electric charge in liquid crystals resulting from a delay in the reversal time of data voltage polarity and severe brightness asymmetry.

At the frame rate of 60 Hz, data of an input image is written to the pixels in every frame f1 to f10. The duration of 1 frame is approximately 16.67 ms at 60 Hz.

FIG. 8 depicts various driving methods in slow driving mode, including 30 Hz progressive, 30 Hz frame skip, 15 Hz frame skip, and 1H frame skip. In the 30 Hz progressive driving method, the frame time f1 to f7 is doubled.

In the 30 Hz skip driving method, data of an input image is written to the pixels during odd-numbered frames f1, f3, . . . , f9, and no new data is written to the pixels during even-numbered frames f2, f4, . . . , f10. During the even-numbered frames f2, f4, . . . , f10, the pixels hold the previous data. In the 15 Hz skip driving method, data of an input image is written to the pixels during (4I+1)th frames f1, f5, and f9 (I is 0 or a positive integer), and no new data is written to the pixels during the remaining frames f2 to f4, f6 to f8, and f10. During the frames f2 to f4, f6 to f8, and f10 during which the data for the pixels is not updated, the pixels hold the previous data. In the 1 Hz skip driving method, data is written to the pixels every second. Data of an input image is written to the pixels in the first frame f1 in every second. The pixels hold the previous data during the remaining frames f2 to f59.

Figure 10:
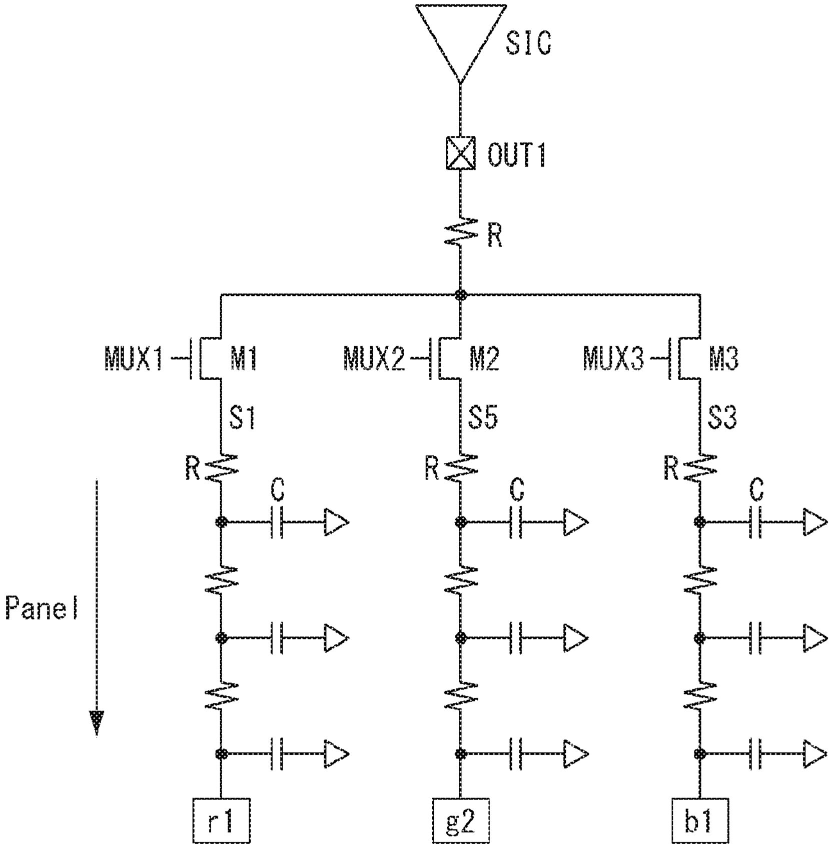
FIG. 10 is a circuit diagram and corresponding waveform diagram showing transistors of multiplexers and their operation.
Figure 10:
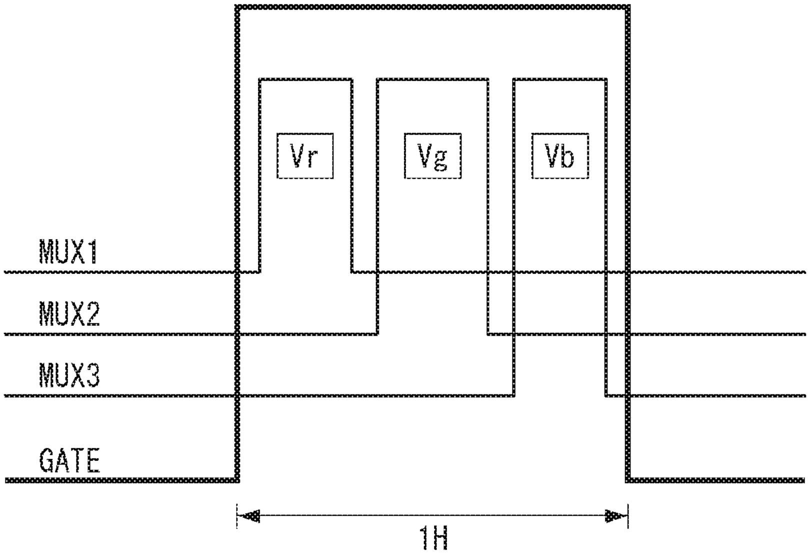

FIGS. 9A and 9B are views showing connections among a source drive IC SIC, multiplexers MUX_A and MUX_B, and pixels r1, g1, b1, r2, g2, and b2. FIG. 9A shows the paths of data voltages in the Nth frame FR(N). FIG. 9B shows the paths of data voltages in the (N+1)th frame FR(N+1). FIG. 10 is a circuit diagram and corresponding waveform diagram showing transistors of multiplexers and their operation. In FIG. 10, Vr denotes red data voltage, Vg denotes green data voltage, and Vb denotes blue data voltage.

Referring to FIGS. 9A and 9B, the source drive IC SIC comprises output buffers BUF1 and BUF2 and switch elements SW1 to SW4.

The multiplexer 103 comprises at least first and second multiplexers MUX_A and MUX_B. The multiplexer 103 may be formed on a substrate of the display panel 100, along with a TFT array. The first multiplexer MUX_A distributes data voltages output through a first output channel OUT1 of the source drive IC SIC to a plurality of data lines. The second multiplexer MUX_B distributes data voltages output through a second output channel OUT2 of the source drive IC SIC to a plurality of data lines.

The first multiplexer MUX_A is connected between the first output channel OUT1 of the source drive IC SIC and odd-numbered data lines, and distributes data voltages of a first polarity, which are input from the source drive IC SIC through the first buffer BUF1 in the Nth frame FR(N) or Nth i horizontal period H(N), to the odd-numbered data lines, and then distributes data voltages of a second polarity, which are input from the source drive IC SIC through the first buffer BUF1 in the (N+1)th frame FR(N+1) or (N+1)th i horizontal period H(N+1), to the odd-numbered data lines.

The second multiplexer MUX_B is connected between the second output channel OUT2 of the source drive IC SIC and even-numbered data lines, and distributes data voltages of the second polarity, which are input from the source drive IC SIC through the second buffer BUF2 in the Nth frame FR(N) or Nth i horizontal period H(N), to the even-numbered data lines, and then distributes data voltages of the first polarity, which are input from the source drive IC SIC through the second buffer BUF2 in the (N+1)th frame FR(N+1) or (N+1)th i horizontal period H(N+1), to the even-numbered data lines.

The first buffer BUF1 of the source drive IC SIC outputs a positive data voltage to be supplied to positive subpixels. The second buffer BUF2 outputs a negative data voltage to be supplied to negative subpixels. The positive subpixels are r1, b1, and g2 during the Nth frame FR(N) or Nth i horizontal period H(N) in the example of FIG. 9A, and are g1, r2, and b2 during the (N+1)th frame FR(N+1) or (N+1)th i horizontal period H(N+1) in the example of FIG. 9B. The negative subpixels are g1, r2, and b2 during the Nth frame FR(N) or Nth i horizontal period H(N) in the example of FIG. 9A, and are r1, b1, and g2 during the (N+1)th frame FR(N+1) or (N+1)th i horizontal period H(N+1) in the example of FIG. 9B.

The switch elements SW1 to SW4 comprise a first switch element SW1 connected between the first buffer BUF1 and the first output channel OUT1, a second switch element SW2 connected between the first buffer BUF1 and the second output channel OUT2, a third switch element SW3 connected between the second buffer BUF2 and the first output channel OUT1, and a fourth switch element SW4 connected between the second buffer BUF2 and the second output channel OUT2.

In the Nth frame FR(N) or Nth i horizontal period H(N), the first and fourth switch elements SW1 and SW4 are turned on as shown in FIG. 9A. In this instant, the first switch element SW1 supplies a positive data voltage (+2.32 V) from the first buffer BUF1 to the first output channel OUT1. The fourth switch element SW4 supplies a negative data voltage (−2.32 V) from the second buffer BUF2 to the second output channel OUT2. The first multiplexer MUX_A distributes the positive data voltage supplied through the first output channel OUT1 to the data lines connected to the positive subpixels r1, b1, and g2 in a time-division manner. The second multiplexer MUX_B distributes the negative data voltage supplied through the second output channel OUT2 to the data lines connected to the negative subpixels g1, r2, and b2 in a time-division manner.

In the (N+1)th frame FR(N+1) or (N+1)th i horizontal period H(N+1), the second and third switch elements SW2 and SW3 are turned on as shown in FIG. 9B. In this instant, the second switch element S2 supplies a positive data voltage (+2.32 V) from the first buffer BUF1 to the second output channel OUT2. The third switch element SW3 supplies a negative data voltage (−2.32 V) from the second buffer BUF2 to the first output channel OUT1. The first multiplexer MUX_A distributes the negative data voltage supplied through the first output channel OUT1 to the data lines connected to the negative subpixels r1, b1, and g2 in a time-division manner. The second multiplexer MUX_B distributes the positive data voltage supplied through the second output channel OUT2 to the data lines connected to the positive subpixels g1, r2, and b2 in a time-division manner.

Referring to FIG. 10, the first and second multiplexers MUX_A and MUX_B each comprise a plurality of transistors M1 to M3. In FIG. 10, only the first multiplexer MUX_A is shown; however, it should be understood that the second multiplexer MUX_B may have the same structure as the first multiplexer MUX_A, while being connected to different subpixels via different data lines. As these transistors M1 to M3 need to be connected to much larger loads R and C on the display panel, compared to the TFT of the pixel shown in FIG. 1, they are implemented as massive transistors which have higher current driving capability than the TFT of the pixel.

The first multiplexer MUX_A may be connected between the first output channel OUT1 and the odd-numbered data lines S1, S3, and S5. In the first multiplexer MUX_A, the first transistor M1 comprises a gate into which a first MUX control signal MUX1 is input, a drain connected to the first output channel OUT1, and a source connected to a subpixel r1 of a first color via the first data line S1. The second transistor M2 comprises a gate into which a second MUX control signal MUX2 is input, a drain connected to the first output channel OUT1, and a source connected to a subpixel g2 of a second color via the fifth data line S5. The third transistor M3 comprises a gate into which a third MUX control signal MUX3 is input, a drain connected to the first output channel OUT1, and a source connected to a subpixel b1 of a third color via the third data line S3.

The MUX control signals MUX1 to MUX3 are sequentially generated while a gate pulse GATE of gate-high voltage VGH is being generated. When the gate pulse GATE has a duration of 1 horizontal period 1H, each of the MUX control signals MUX1 to MUX3 is generated for approximately ⅓ horizontal period of the duration of the pulse.

The TFTs of the subpixels are turned on when the gate pulse GATE maintains gate-high voltage VGH, to thereby connect data lines to the pixel electrode 1. Therefore, the transistors M1 to M3 of the first multiplexer MUX_A are sequentially turned on/off while the pixel electrode 1 is connected to the data lines, to thereby distribute data voltages from the first output channel OUT1 to the data lines S1, S3, and S5 in a time-division manner.

The second multiplexer MUX_B (not shown) may be connected between the second output channel OUT2 and the even-numbered data lines S2, S4, and S6. In the second multiplexer MUX_B, the first transistor M1 comprises a gate into which the first MUX control signal MUX1 is input, a drain connected to the second output channel OUT2, and a source connected to a subpixel g1 of the second color via the second data line S2. The second transistor M2 comprises a gate into which the second MUX control signal MUX2 is input, a drain connected to the second output channel OUT2, and a source connected to a subpixel r2 of the first color via the fourth data line S4. The third transistor M3 comprises a gate into which the third MUX control signal MUX3 is input, a drain connected to the second output channel OUT2, and a source connected to a subpixel b2 of the third color via the sixth data line S6.

The transistors M1 to M3 of the second multiplexer MUX_B are sequentially turned on/off while the pixel electrode 1 is connected to the data lines, to thereby distribute data voltages from the second output channel OUT2 to the data lines S2, S4, and S6 in a time-division manner.

Figure 11:
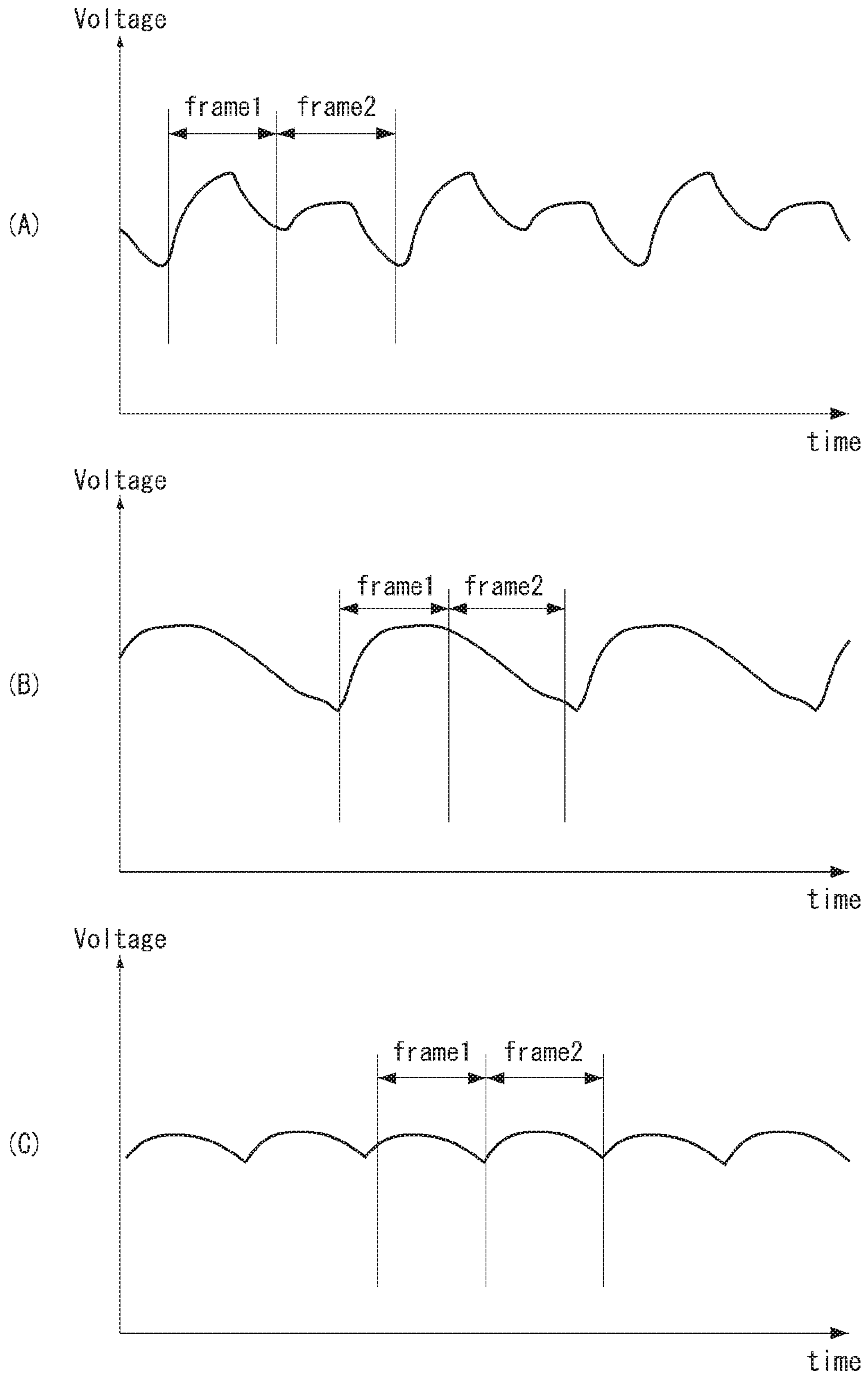
FIG. 11 illustrates waveform diagrams of test results showing brightness asymmetry between frames.

FIG. 11 is a view of test results showing brightness asymmetry between frames.

(A) and (B) of FIG. 11 show an example in which the brightness measurements at the same gray level vary between frames when a conventional display device is driven in slow driving mode 30H. In the conventional display device, the reference power PVDD, VDD, NVDD, and Va for gamma-compensated voltages is not varied. In a severe situation, the brightness changes towards a lower frequency such as 15 Hz as shown in (B) when the conventional display device is driven in slow driving mode, and the user will notice severe flicker. (C) shows the result of brightness measurements in frames when the reference power PVDD, VDD, NVDD, and Va for gamma-compensated voltages in a display device according to the present disclosure is varied with every frame.

Figure 12:
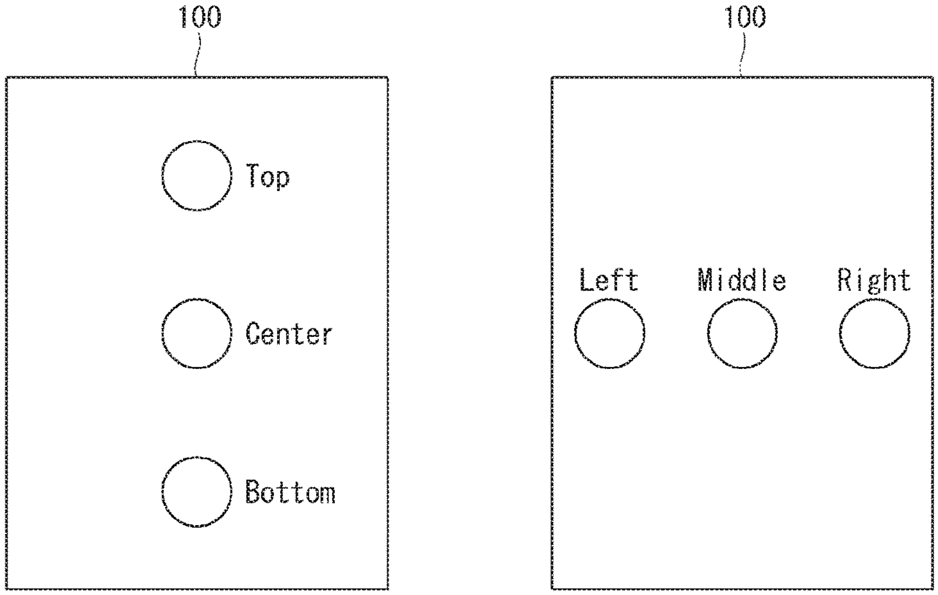
FIG. 12 is a view showing the positions on the display panel at which brightness measurements were made.
Figure 13:
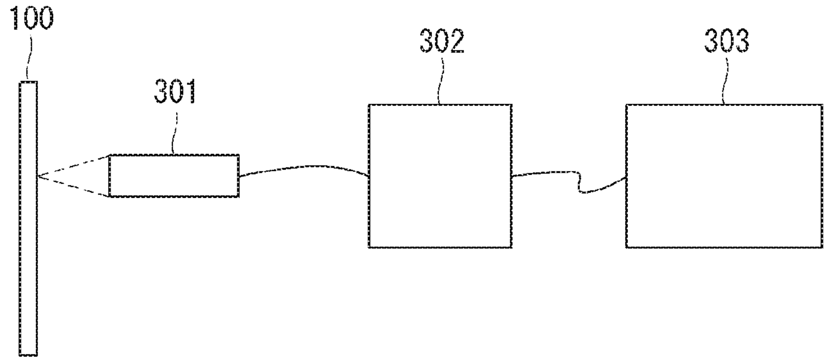
FIG. 13 is a block diagram showing a brightness measurement system.
Figure 14:
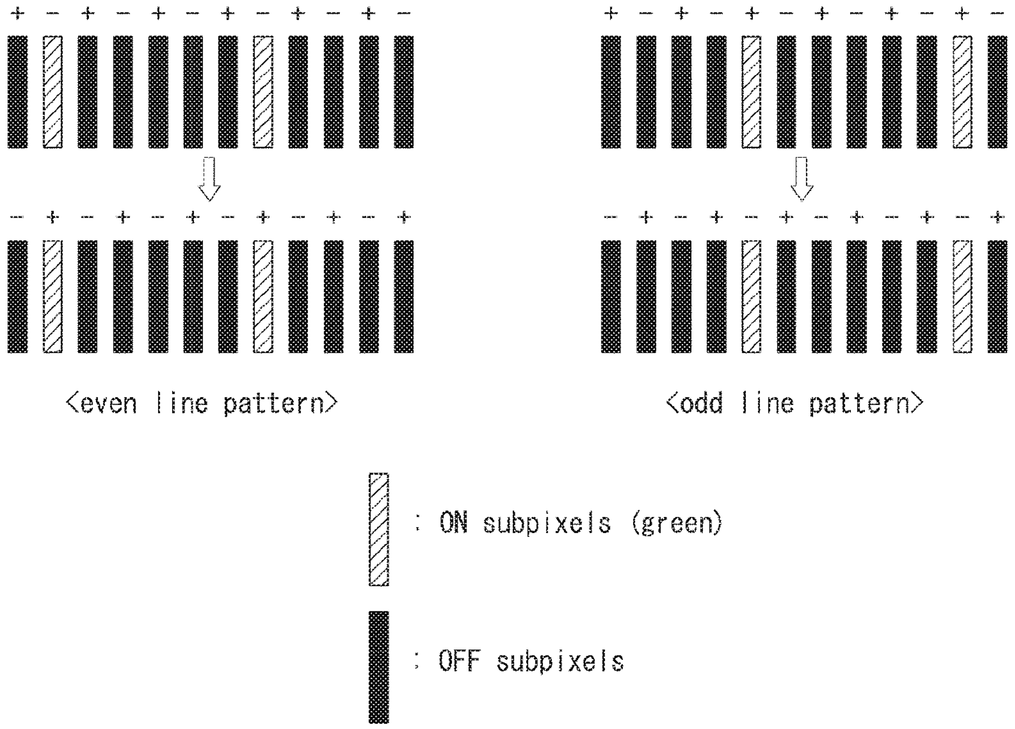
FIG. 14 is a view showing an example of test patterns displayed on the display panel when brightness measurements were made.
Figure 15:
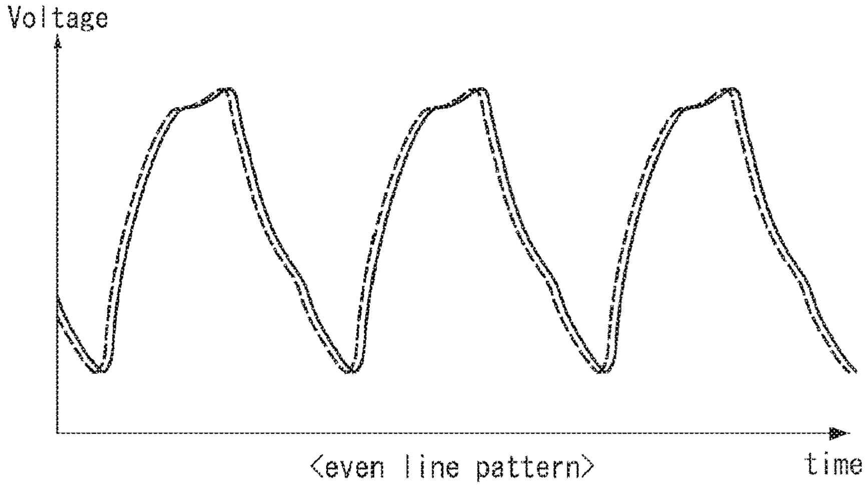
FIG. 15 illustrates waveform diagrams showing the results of brightness measurements on the test patterns of FIG. 14.
Figure 15:
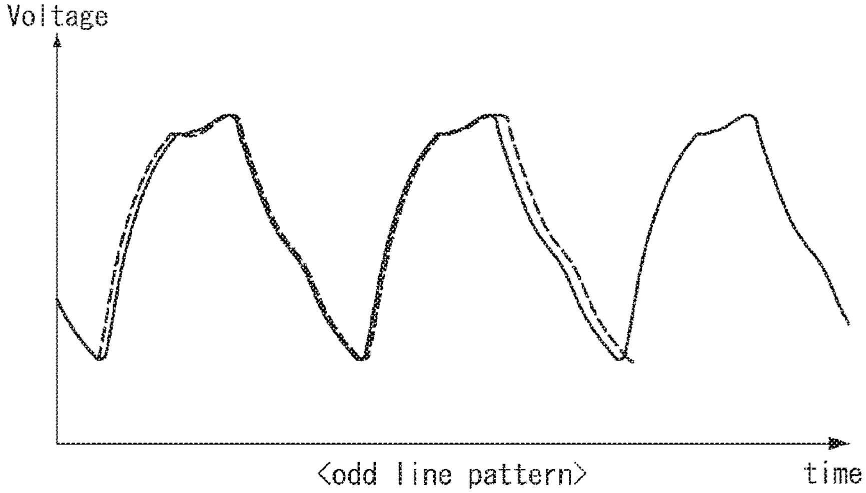
Figure 15:
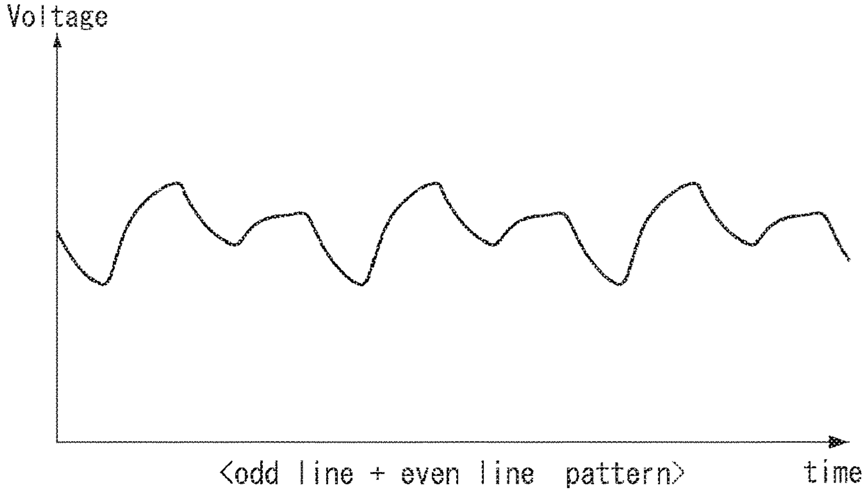

FIG. 12 is a view showing the positions on the display panel 100 at which brightness measurements were made. FIG. 13 is a view showing a brightness measurement system. FIG. 14 is a view showing an example of test patterns displayed on the display panel 100 when brightness measurements were made. FIG. 15 is a view showing the results of brightness measurements on the test patterns of FIG. 14.

Referring to FIGS. 12 to 15, the brightness measurement system measures the brightness of pixels at given intervals on the display panel 100 while preset test patterns (FIG. 14) are displayed on the display panel 100. The brightness may be measured at the top, center, and bottom of the display panel 100 or at the left, middle, and right thereof, as shown in FIG. 12.

As shown in FIG. 13, the brightness measurement system comprises a photoelectric conversion element 301, an amplifier 302, a measuring instrument 303, etc. The photoelectric conversion element 301 may comprise a photodiode. An oscilloscope may be selected as the measuring instrument 303. FIGS. 11 and 15 are views of the screen of an oscilloscope.

Referring to FIG. 14, the test patterns displayed on the display panel 100 comprise a first data pattern (even line pattern) for measuring the brightness of pixels connected to even-numbered data lines on the display panel 100, and a second data pattern (odd line pattern) for measuring the brightness of pixels connected to odd-numbered data lines on the display panel 100.

The first data pattern (even line pattern) comprises green data of a high gray level that is applied to the green subpixels, among the pixels connected to the even-numbered data lines, so that only the green subpixels having a high brightness ratio are lit up. Data other than this green data of the high gray level is the black level, which is the minimum gray level. When a data voltage of the first data pattern (even line pattern) is applied to the pixels on the display panel 100 via the data lines S1 to Sm, the green subpixels, among the pixels connected to the even-numbered lines, are lit up. When the first data pattern (even line pattern) is displayed on the display panel 100, the green subpixels g1 are charged with a green data voltage of the high gray level that has passed through the second multiplexer MUX_B.

The second data pattern (odd line pattern) comprises green data of a high gray level that is applied to the green subpixels, among the pixels connected to the odd-numbered data lines, so that only the green subpixels having a high brightness ratio are lit up. Data other than this green data of the high gray level is the black level, which is the minimum gray level. When a data voltage of the second data pattern (odd line pattern) is applied to the pixels on the display panel 100 via the data lines S1 to Sm, the green subpixels, among the pixels connected to the odd-numbered lines, are lit up. When the second data pattern (odd line pattern) is displayed on the display panel 100, the green subpixels g2 are charged with a green data voltage of the high gray level that has passed through the first multiplexer MUX_A.

FIG. 15 shows the results of brightness measurements made after the first data pattern (even line pattern) and the second data pattern (odd line pattern) were displayed in frames in a time-division manner on the conventional display device. As can be seen from these results of brightness measurements, when the conventional display device is configured with slow driving mode, brightness asymmetry may occur between the subpixels connected to the first multiplexer MUX_A and the subpixels connected to the second multiplexer MUX_B. Consequently, in the related art, the user may perceive a degradation in image quality in slow driving mode due to vertical crosstalk, flicker, etc.

The causes of brightness asymmetry include on/off operations of the multiplexers MUX_A and MUX_B and charge channel injection (CCI) in the transistors.

As can be seen from FIG. 10, the voltages ΔVp of the subpixels drop as the transistors M1 to M3 of the multiplexers MUX_A and MUX_B are turned off while the pixel electrode 1 is connected to the data lines by the TFT of the pixel turned on by the gate pulse GATE. In this case, the voltages ΔVp of the subpixels vary due to the variation between the multiplexers MUX_A and MUX_B, thus causing a brightness variation.

Figure 16:
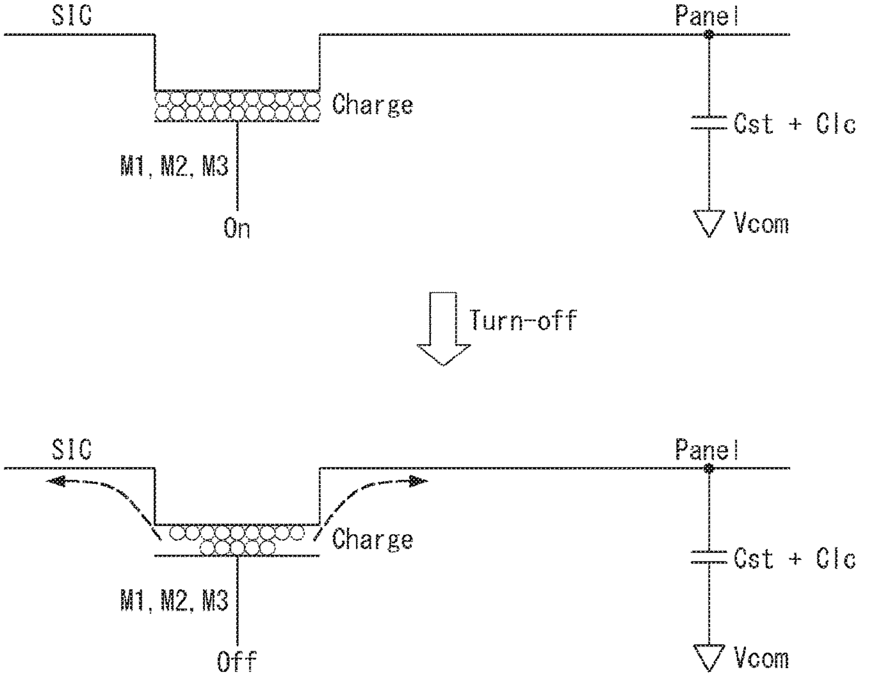
FIG. 16 is a schematic diagram showing a charge channel injection (CCR) in the transistors.

The charge channel injection in the transistors refer to forming a channel at the interface between a gate insulating film (oxide) and an active layer (silicon), as shown in FIG. 16, in order to turn on the transistors M1 to M3 that are implemented as MOSFETs (metal oxide semiconductor field effect transistors). When the transistors M1 to M3 are turned off, the charges forming the channel exit through the source and drain terminals. In this instant, the variation between the multiplexers MUX_A and MUX_B causes a difference in charge distribution, and therefore the voltages ΔVp of the subpixels vary.

Brightness asymmetry is severe on a display device in which there is variation between the massive transistors constituting the multiplexers MUX_A and MUX_B. As described above, the massive transistors M1, M2, and M3 are required for the multiplexers MUX_A and MUX_B because they are connected to loads comprising all the resistances R and capacitances C on the display panel 100 via data lines. On the contrary, the TFT of the pixel may be designed to be small in size because it is connected to only one subpixel.

When the power supply voltages PVDD, VDD, NVDD, and Va and the gamma tap voltages GMA_A and GMA_D are fixed as in the related art, the variation between the multiplexers MUX_A and MUX_B creates a difference in in voltage ΔVp between the positive pixels and the negative pixels, and as a result, brightness asymmetry between the pixels may be seen at the same gray level. In FIGS. 9A and 9B, when the rate of change of the data voltage applied to the odd-numbered data lines because of the first multiplexer MUX_A is denoted by "a" and the rate of change of the data voltage applied to the even-numbered data lines because of the second multiplexer MUX_B is denoted by "b", the source drive IC SIC outputs a positive data voltage (+2.32 V) and a negative data voltage (−2.32 V), which have the same voltage difference with respect to the common voltage Vcom, during the (N+1)th frame FR(N+1), but the positive pixels and the negative pixels have different voltages. As shown in FIG. 9B, the voltage (ΔVp=+2.32 V*b) of the subpixel g1 and the voltage (ΔVp=−2.32 V*a) of the subpixel g2 are different due to the variation between the multiplexers MUX_A and MUX_B. Thus, a brightness difference between the positive pixels and the negative pixels occurs with every frame even at the same gray level.

In the present disclosure, at least one or more of the power supply voltages PVDD, VDD, NVDD, and Va are adjusted in order to compensate for brightness asymmetry in the display device. As a result, at the same gray level, the positive data voltage applied to the positive pixels and the negative data voltage applied to the negative pixels have the same voltage difference with respect to the common voltage. Therefore, the positive and negative pixels have the same brightness.

Figure 17:
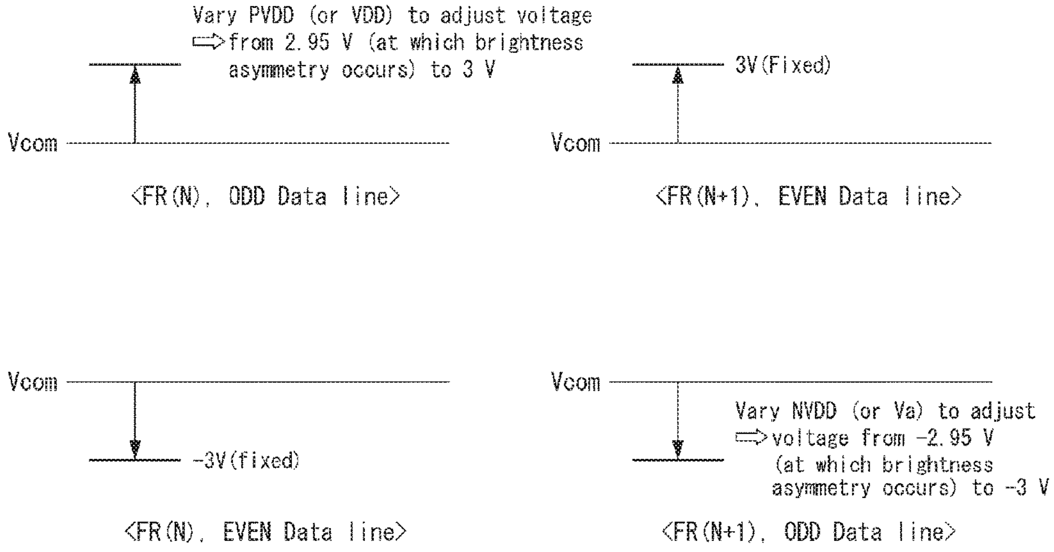
FIG. 17 is a schematic diagram showing a method of compensating for brightness asymmetry according to the present disclosure.

As shown in FIGS. 9A and 9B, in the present disclosure, when odd-numbered data lines are connected to the first multiplexer MUX_A and even-numbered data lines are connected to the second multiplexer MUX_B, data voltages of first polarity (positive or negative) applied to the odd-numbered data lines may be adjusted based on data voltages of second polarity (negative or positive) applied to the even-numbered data lines, as shown in the example of FIG. 17.

In the example of FIG. 17, during the Nth frame FR(N) or Nth i horizontal period H(N), when the common voltage Vcom is 0 V, the negative data voltage and the positive data voltage are −3 V and +2.95 V, respectively, at the same gray level, due to the variation between the multiplexers MUX_A and MUX_B. In the present disclosure, during the Nth frame FR(N) or Nth i horizontal period H(N), PVDD or VDD is adjusted to regulate the positive data voltage of +2.95 V supplied to the odd-numbered data lines to +3 V. During the (N+1)th frame FR(N+1) or (N+1)th i horizontal period H(N+1), the negative data voltage and the positive data voltage are −2.95 V and is +3 V, respectively, at the same gray level. In the present disclosure, during the (N+1)th frame FR(N+1) or (N+1)th i horizontal period H(N+1), NVDD or Va is adjusted to regulate the negative data voltage of −2.95 V supplied to the odd-numbered data lines to −3 V.

Figure 18:
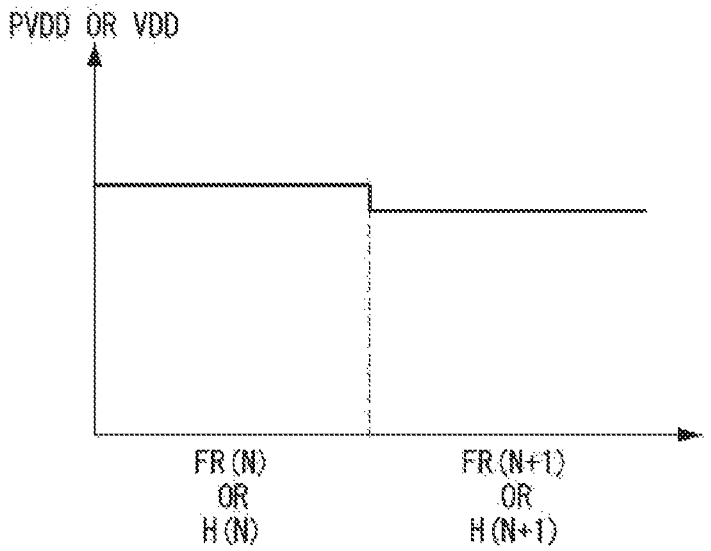
FIG. 18 is a plot showing an example of variations in power supply voltages.
Figure 18:
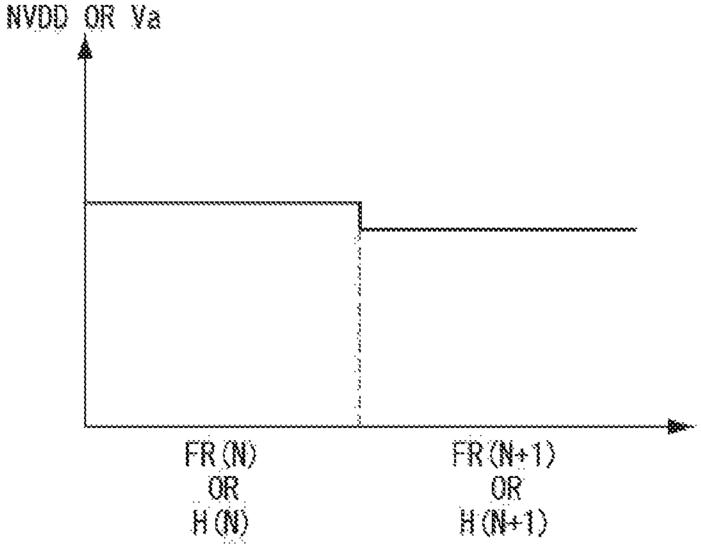

FIG. 18 shows PVDD (or VDD) and NVDD (or Va) which vary at given time intervals. Although FIG. 18 depicts an example in which PVDD (or VDD) drops in the (N+1)th frame FR(N+1) or (N+1)th i horizontal period H(N+1), the present disclosure is not limited to this example. Also, the present disclosure is not limited to an example in which NVDD (or Va) drops in the (N+1)th frame FR(N+1) or (N+1)th i horizontal period H(N+1). The direction and amount of variation of the power supply voltages PVDD, VDD, NVDD, and Va may vary depending on the above-mentioned results of brightness measurements of the pixels connected to the odd-numbered data lines and the pixels connected to the even-numbered data lines.

In the present disclosure, as described above, according to the results of brightness measurements of the pixels connected to the odd-numbered data lines and the pixels connected to the even-numbered data lines, the power supply voltages PVDD, VDD, NVDD, and Va are varied based on the rate (a) of change of the voltage on the pixels connected to the odd-numbered data lines and the rate (b) of change of the voltage on the pixels connected to the even-numbered data lines.

The brightness measurement system calculates the ratio b/a based on the aforementioned brightness measurement test, and stores the b/a in a memory connected to the timing controller 105. An operational circuit in the timing controller 105 may adjust the power supply voltages PVDD, VDD, NVDD, and Va by multiplying power supply data VDD_DATA indicating the voltage levels of the power supply voltages PVDD, VDD, NVDD, and Va by the b/a stored in the memory.

The rate (a) of change of the voltage on the pixels connected to the odd-numbered data lines and the rate (b) of change of the voltage on the pixels connected to the even-numbered data lines may be measured through the brightness measurement test of FIGS. 11 to 15.

The rate (a) of change of the voltage on the pixels connected to the odd-numbered data lines may be measured using the data voltage at which the second data pattern (odd line pattern) causes the pixels to have maximum brightness at a particular gray level when applied to the data lines. The rate (b) of change of the voltage on the pixels connected to the even-numbered data lines may be measured using the data voltage at which the first data line (even line pattern) causes the pixels to have maximum brightness at a particular gray level when applied to the data lines. The even-numbered green subpixels of the first data pattern (even line pattern) and the odd-numbered green subpixels of the second data pattern (odd line pattern) have the same gray level, for example, "127". The brightness of the first data pattern (even line pattern) may be measured during even-numbered frames, and the brightness of the second data pattern (odd line pattern) may be measured during odd-numbered frames, but they are not limited thereto. b/a is the ratio (b/a) of the rate (a) of change of the voltage on the pixels connected to the odd-numbered data lines to the rate (b) of change of the voltage on the pixels connected to the even-numbered data lines, which is calculated by the brightness measurement system and stored in the memory of the timing controller 105.

In the case shown in FIG. 17, b/a=3 V/2.95 V. In the present disclosure, PVDD (or VDD) is adjusted to PVDD=5 V×3V/2.95 V=5.08 V during the Nth frame FR(N) or Nth i horizontal period H(N). As a result, the voltage of the positive pixels connected to the odd-numbered data lines changes from 2.95 V to 3 V.

FIGS. 19A to 21B are views showing an example in which high-potential power supply voltage and low-potential power supply voltage are adjusted based on the ratio (b/a) between the rate of change of positive pixel voltage and the rate of change of negative pixel voltage.

Figure 19A:
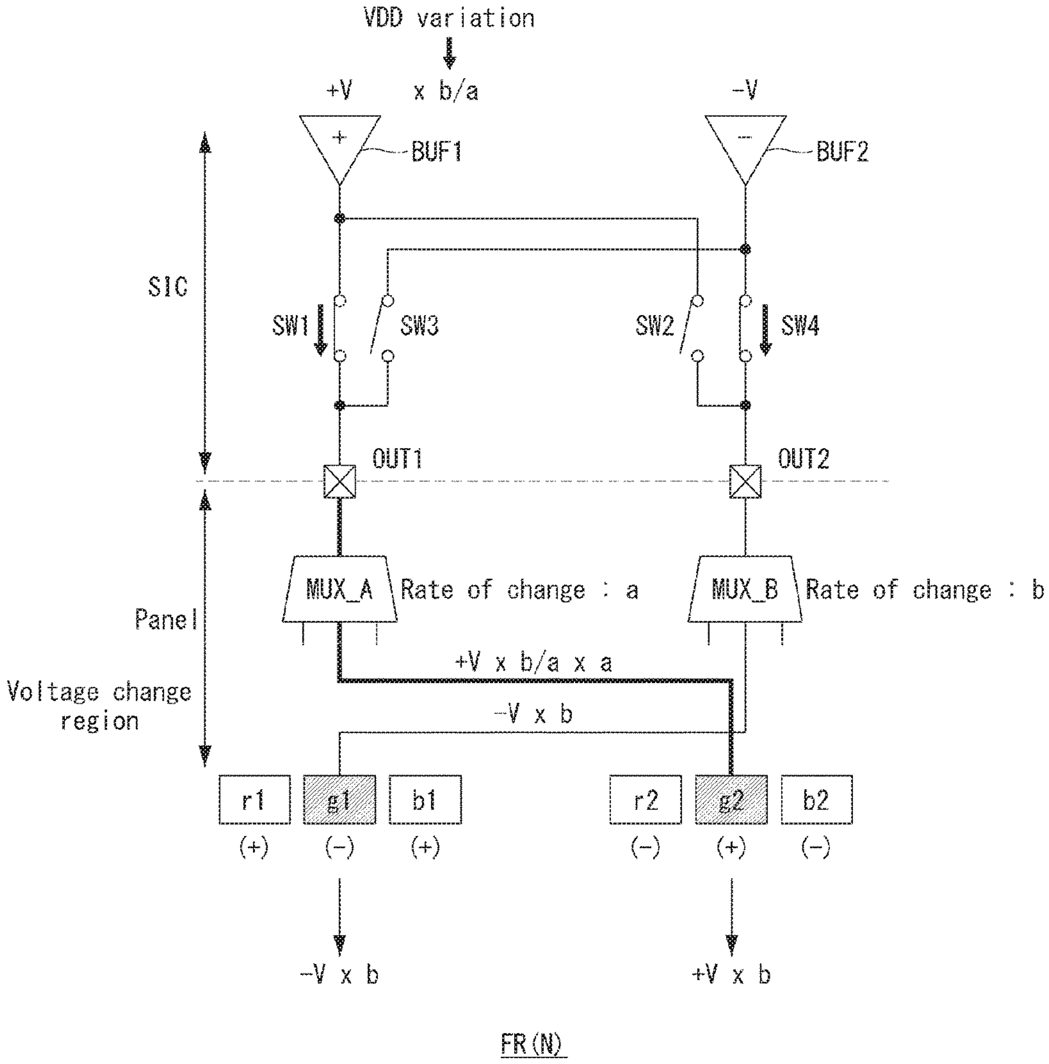
FIGS. 19A to 21B are schematic diagrams showing an example in which power supply voltages are adjusted based on the ratio between the rate (a) of change of the voltage on pixels connected to odd-numbered data lines and the rate (b) of change of the voltage on pixels connected to even-numbered data lines.
Figure 19B:
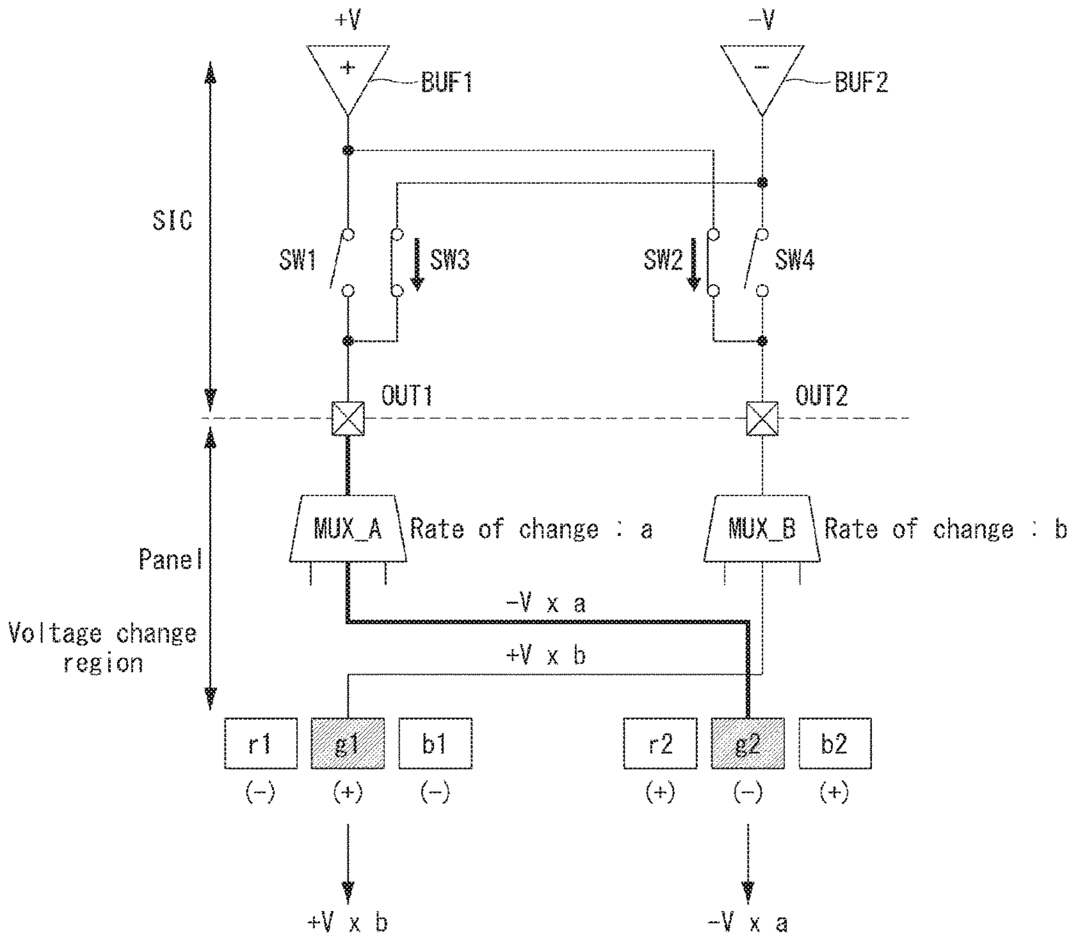

Referring to FIGS. 19A and 19B, this embodiment is an example in which, during the Nth frame FR(N) or Nth i horizontal period H(N), VDD is adjusted by multiplying VDD by b/a, to thereby regulate the positive data voltage applied to the positive pixels to +V*b. As a result, at the same gray level, the positive pixel voltage +V*b and the negative pixel voltage −V*b have the same voltage difference during the Nth frame FR(N) or Nth i horizontal period H(N). Therefore, the positive and negative pixels have the same brightness.

Figure 20A:
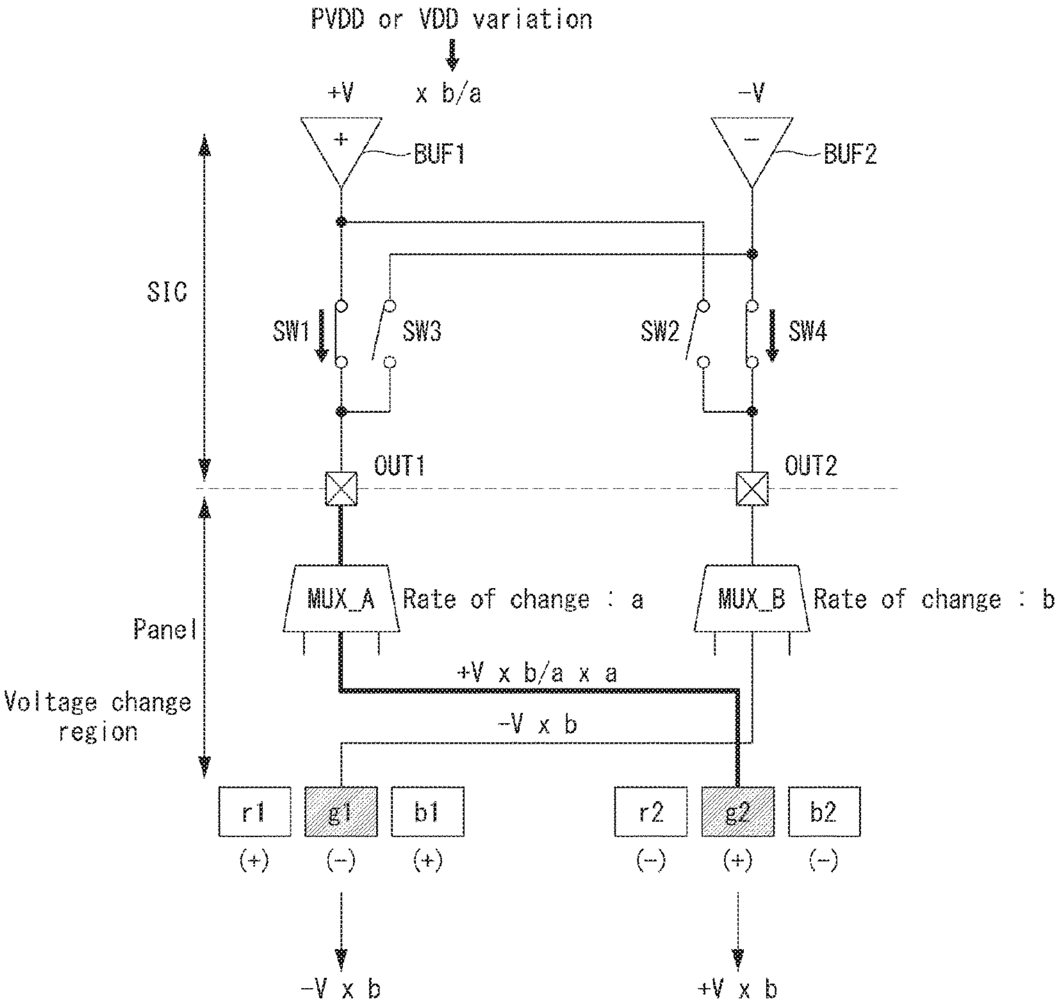
Figure 20B:
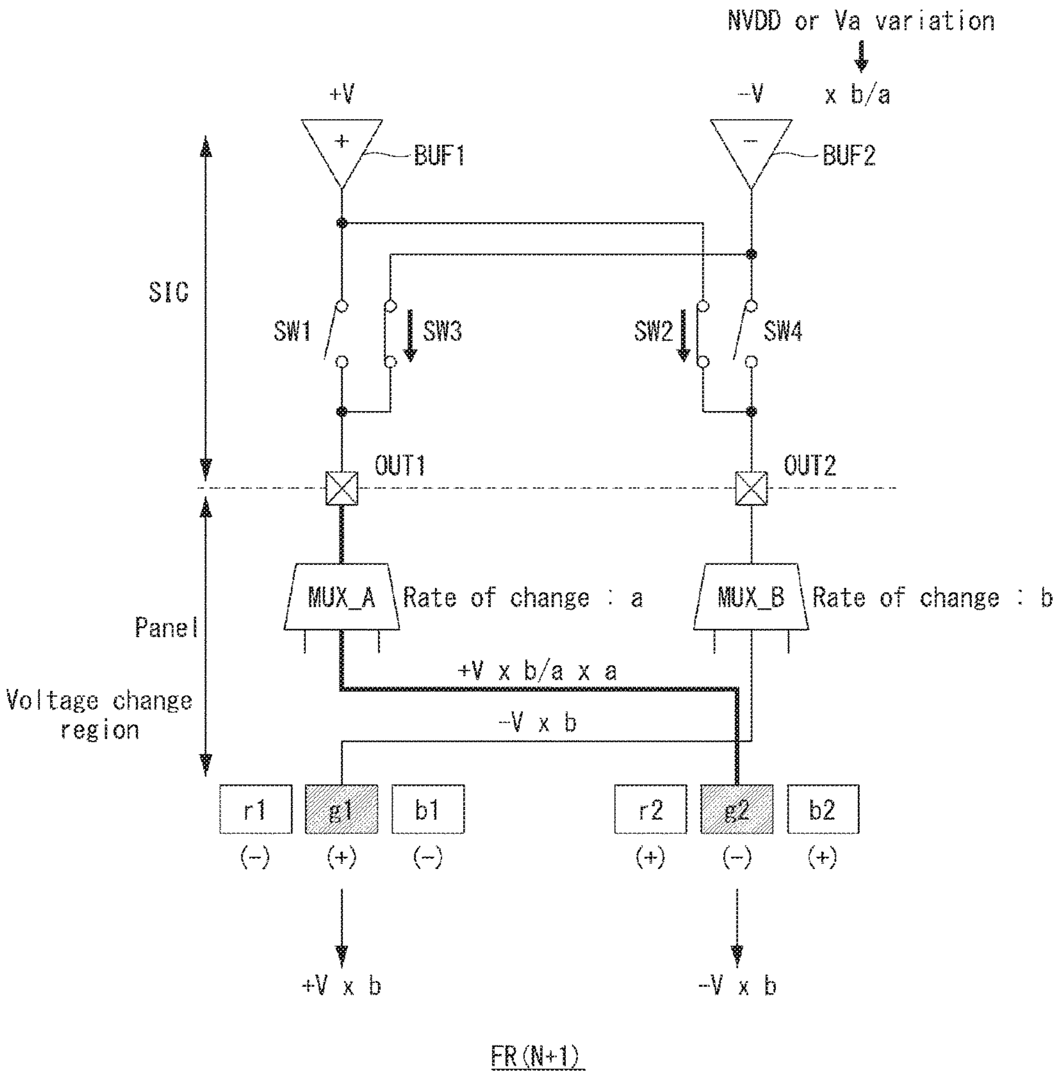

Referring to FIGS. 20A and 20B, this embodiment is an example in which, during the Nth frame FR(N) or Nth i horizontal period H(N), PVDD (or VDD) is adjusted by multiplying PVDD (or VDD) by b/a, to thereby regulate the positive data voltage applied to the positive pixels to +V*b. Next, in this embodiment, during the (N+1)th frame FR(N+1) or (N+1)th i horizontal period H(N+1), NVDD (or Va) is adjusted by multiplying NVDD (or Va) by b/a, to thereby regulate the negative data voltage applied to the negative pixels to −V*b. In this embodiment, at the same gray level, the positive pixel voltage +V*b and the negative pixel voltage −V*b have the same voltage difference during all frames. Therefore, the positive and negative pixels have the same brightness.

Figure 21A:
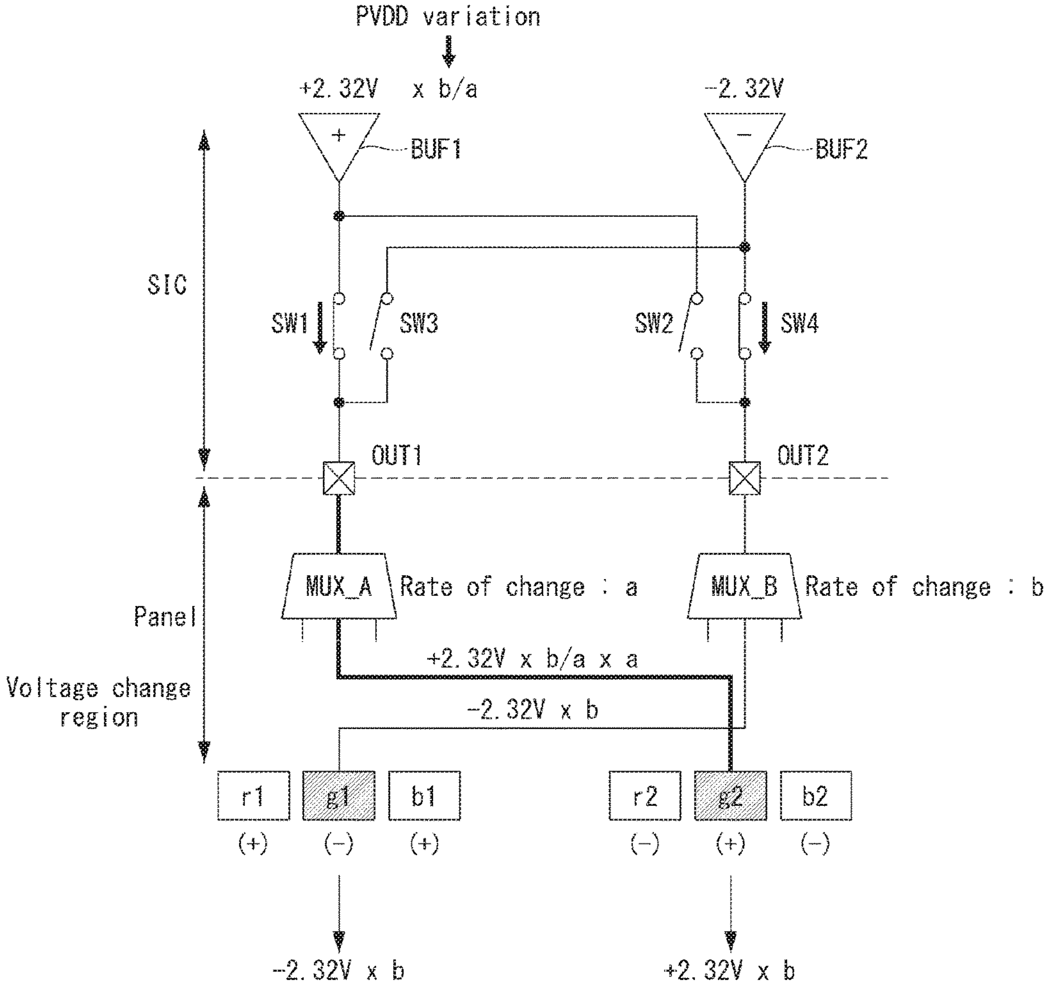
Figure 21B:
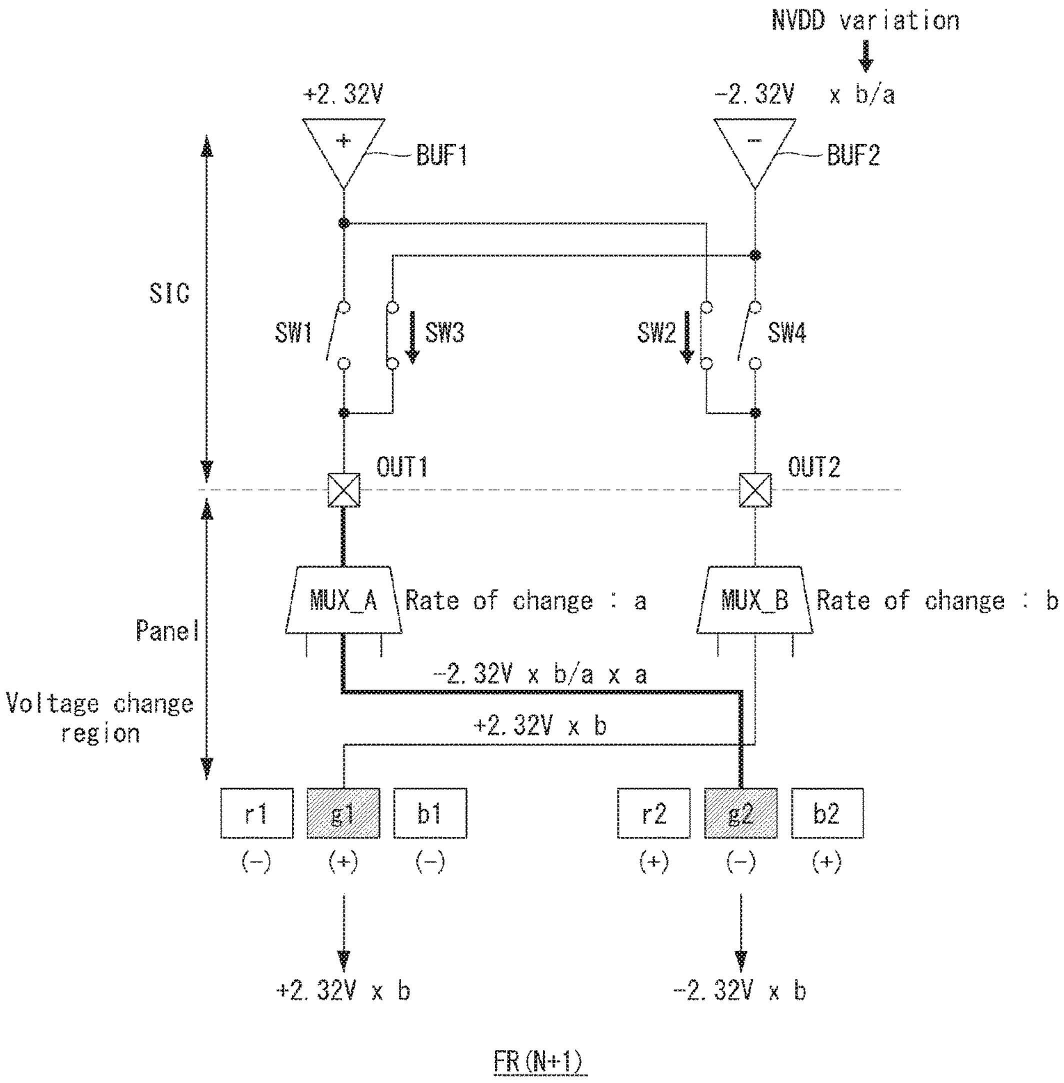

FIGS. 21A and 21B show an example in which positive data voltage is regulated by multiplying PVDD (or VDD) by b/a during the Nth frame FR(N) and or Nth i horizontal period H(N), and then negative data voltage is regulated by multiplying NVDD (or Va) by b/a during the (N+1)th frame FR(N+1) or (N+1)th i horizontal period H(N+1), in order to compensate for the brightness asymmetry of FIGS. 9A and 9B.

In another embodiment, the gamma tab voltages GMA_A to GMA_B may be adjusted as well as the power supply voltages PVDD, VDD, NVDD, and Va.

In the present disclosure, different brightness measurements may be obtained from the pixels connected to the odd-numbered data lines and the pixels connected to the even-numbered data lines by varying the position of the screen on the display panel in the brightness measurement test of FIGS. 11 to 15. Based on the measurement results, the power supply voltages PVDD, VDD, NVDD, and Va may be controlled to a voltage optimized to compensate for brightness asymmetry for each position of the screen.

Figure 22:
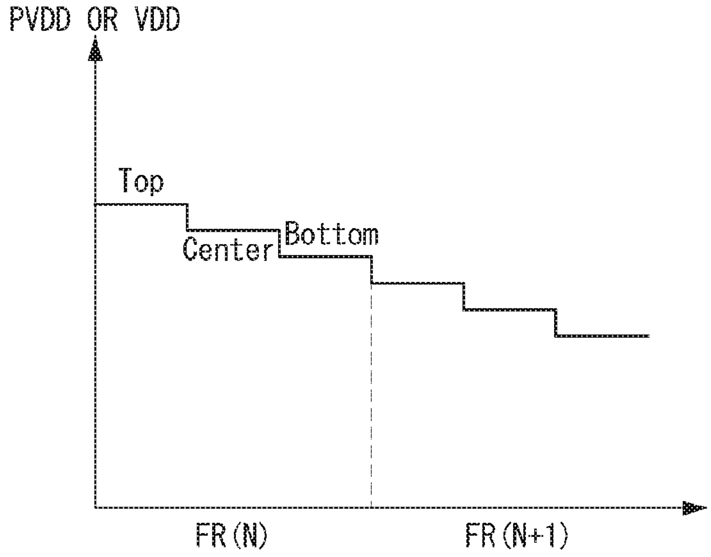
FIG. 22 is a plot showing an example in which a power supply voltage is varied for each position of the screen of FIG. 12, such as the top, center, and bottom.
Figure 23:
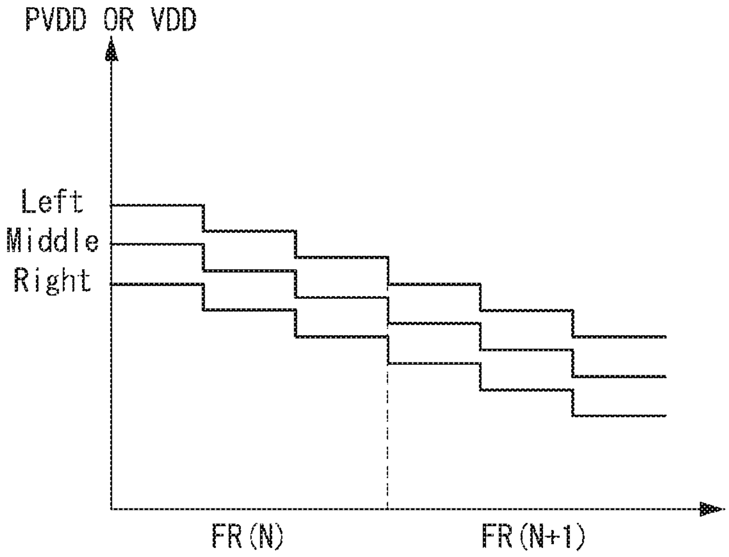
FIG. 23 is a plot showing an example in which a power supply voltage is varied for each position of the screen of FIG. 12, such as the left, middle, and right.
Figure 24:
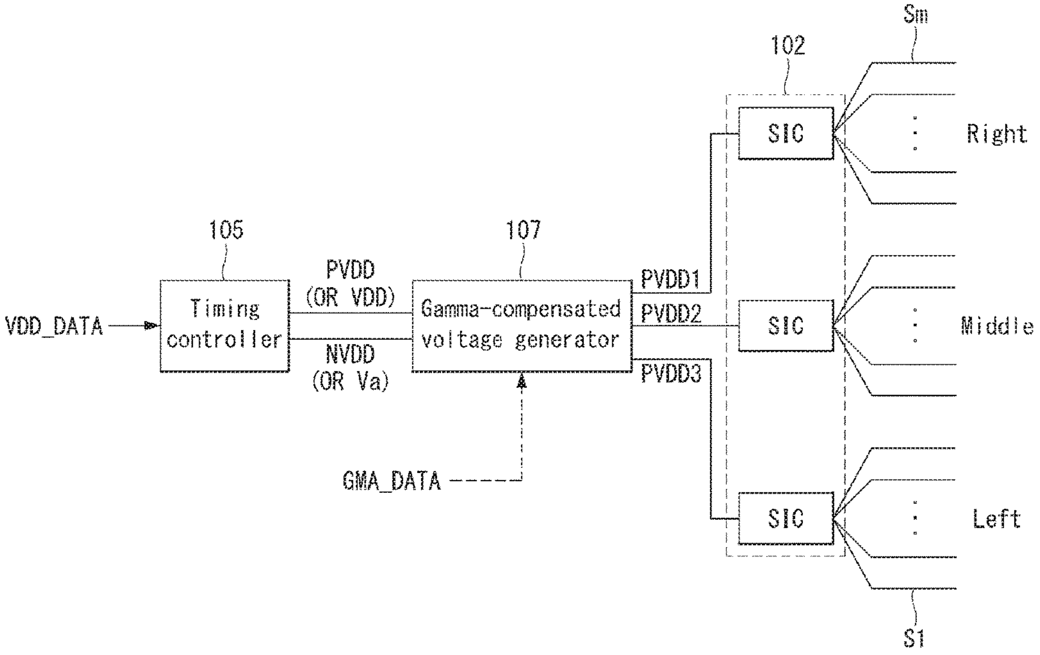
FIG. 24 is a block diagram showing an example in which power supply voltages are applied individually to each source drive IC.

FIG. 22 shows an example in which a power supply voltage PVDD, VDD, NVDD, or Va is varied for each position of the screen of FIG. 12, such as the top, center, and bottom. FIG. 23 shows an example in which a power supply voltage PVDD, VDD, NVDD, or Va is varied for each position of the screen of FIG. 12, such as the left, middle, and right. To vary the power supply voltages PVDD, VDD, NVDD, and Va with the screen position, power supply voltages PVDD1, PVDD2, and PVDD3 may be applied individually to each source drive IC SIC, as illustrated in FIG. 24. Although not shown in the drawing, other power supply voltages such as VDD, NVDD, and Va and the gamma tap voltages GMA_A to GMA_D may be applied individually to each source drive IC SIC. Needless to say, the embodiment of FIGS. 22 and 23 may be applied along with the foregoing embodiments of FIGS. 17 to 21B.

As described above, the present disclosure may prevent brightness asymmetry between positive pixels and negative pixels since a positive data voltage applied to the positive pixels and a negative data voltage applied to the negative pixels are made the same at the same gray level by adjusting at least one power supply voltage, and therefore provide excellent image quality in slow driving mode without vertical crosstalk, flicker, etc.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A liquid-crystal display device, comprising:

a display panel on which data lines, gate lines, and pixels are arranged in a matrix;

a power supply configured to generate first and second power supply voltages;

a gamma-compensated voltage generator configured to generate gamma-compensated voltages by dividing voltages between the first power supply voltage and the second power supply voltage;

a data driver configured to convert data of an input image to the gamma-compensated voltages to output data voltages; and a multiplexer configured to distribute the data voltages output from the data driver to a plurality of data lines;

wherein the power supply alternately varies the first and second power supply voltages at a given time interval, wherein the multiplexer is disposed between the data driver and the data lines and supplies data voltages input through one output channel of the data driver to a plurality of the data lines in a time-division manner using a plurality of transistors, wherein each of the transistors of the multiplexer has a higher current driving capability than a transistor of the pixels.

2. The liquid-crystal display device of claim 1, wherein the given time interval is one frame, and the power supply alternately varies the first power supply voltage and the second power supply voltage at each interval of one frame.

3. The liquid-crystal display device of claim 1, wherein the given time interval is at least one horizontal period, and the power supply alternately varies the first power supply voltage and the second power supply voltage at each interval of the at least one horizontal period.

4. The liquid-crystal display device of claim 1, further comprising a timing controller configured to output power supply data indicating voltage levels of the first and second power supply voltages and sends the data of the input image to the data driver, wherein the power supply adjusts the first and second power supply voltages in response to the power supply data.

5. The liquid-crystal display device of claim 1, wherein the multiplexer comprises:

a first multiplexer connected between a first output channel of the data driver and a plurality of odd-numbered data lines, the first multiplexer distributes data voltages of a first polarity, which are input from the data driver in an Nth frame (where N is a positive integer) or Nth i horizontal period (where i is 1 or 2), to the odd-numbered data lines, and then distributes data voltages of a second polarity, which are input from the data driver in an (N+1)th frame or (N+1)th i horizontal period, to the odd-numbered data lines; and a second multiplexer connected between a second output channel of the data driver and a plurality of even-numbered data lines, the second multiplexer distributes data voltages of the second polarity, which are input from the data driver in the Nth frame or Nth i horizontal period, to the even-numbered data lines, and then distributes data voltages of the first polarity, which are input from the data driver in the (N+1)th frame or (N+1)th i horizontal period, to the even-numbered data lines.

6. The liquid-crystal display device of claim 5, wherein the timing controller adjusts the first and second power supply voltages by multiplying the power supply data by a ratio (b/a) of a rate (a) of change of the voltage on the pixels connected to the odd-numbered data lines to the rate (b) of change of the voltage on the pixels connected to the even-numbered data lines.

7. The liquid-crystal display device of claim 6, further comprising a memory that stores the ratio (b/a), the timing controller configured to adjust the first and second power supply voltages based on the ratio (b/a) stored in the memory.

8. The liquid-crystal display device of claim 1, wherein the display panel is driven at a frame rate of 1 Hz to 30 Hz.

9. A liquid-crystal display device comprising:

a display panel on which data lines and gate lines intersect and pixels are arranged in a matrix;

a power supply configured to generate first and second power supply voltages;

a gamma-compensated voltage generator configured to generate positive and negative gamma-compensated voltages by dividing voltages between the first power supply voltage and the second power supply voltage;

a data driver configured to convert data of an input image to the positive and negative gamma-compensated voltages to output positive and negative data voltages; and a multiplexer that distributes the positive and negative data voltages output from the data driver to a plurality of data lines;

wherein the power supply alternately varies the first and second power supply voltages to adjust the positive and negative data voltages with each frame or with each horizontal period, wherein the multiplexer is disposed between the data driver and the data lines and supplies data voltages input through one output channel of the data driver to a plurality of the data lines in a time-division manner using a plurality of transistors, wherein each of the transistors of the multiplexer has a higher current driving capability than a transistor of the pixels.

10. The liquid-crystal display device of claim 9, wherein the power supply adjusts the first power supply voltage and the positive gamma-compensated voltage in an Nth frame (N is a positive integer) or Nth i horizontal period (i is 1 or 2), adjusts the second power supply voltage and the negative gamma-compensated voltage in an (N+1)th frame or (N+1)th i horizontal period, and varies the first power supply voltage and the positive gamma-compensated voltage alternately with the second power supply voltage and the negative gamma-compensated voltage.

11. The liquid-crystal display device of claim 9, wherein the positive data voltage supplied to the data lines varies with the first power supply voltage and the positive gamma-compensated voltage, and the negative data voltage supplied to the data lines varies with the second power supply voltage and the negative gamma-compensated voltage.

12. The liquid-crystal display device of claim 9, wherein the gamma-compensated voltage generator includes at least one voltage divider configured to generate the positive and negative gamma-compensated voltages as divided voltages between the first and the second power supply voltages, the at least one voltage divider having a first terminal that receives the first power supply voltage and a second terminal that receives the second power supply voltage, the first and second terminals being different from one another.

13. The liquid-crystal display device of claim 9, wherein the multiplexer comprises:

a first multiplexer connected between a first output channel of the data driver and a plurality of odd-numbered data lines, the first multiplexer distributes the positive data voltages, which are input from the data driver in an Nth frame (where N is a positive integer) or Nth i horizontal period (where i is 1 or 2), to the odd-numbered data lines, and distributes the negative data voltages, which are input from the data driver in an (N+1)th frame or (N+1)th i horizontal period, to the odd-numbered data lines; and a second multiplexer connected between a second output channel of the data driver and a plurality of even-numbered data lines, the second multiplexer distributes the negative data voltages, which are input from the data driver in the Nth frame or Nth i horizontal period, to the even-numbered data lines, and distributes the positive data voltages, which are input from the data driver in the (N+1)th frame or (N+1)th i horizontal period, to the even-numbered data lines.

14. The liquid-crystal display device of claim 9, wherein the power supply varies the first and second power supply voltages based on a ratio (b/a) of a rate (a) of change of the voltage on the pixels connected to the odd-numbered data lines to a rate (b) of change of the voltage on the pixels connected to the even-numbered data lines.

15. A driving method of a liquid-crystal display device, the method comprising:

generating first and second power supply voltages;

generating, by at least one voltage divider, gamma-compensated voltages by dividing voltages between the first power supply voltage and the second power supply voltage, the first power supply voltage being supplied to a first terminal of the at least one voltage divider and the second power supply voltage being supplied to a second terminal of the at least one voltage divider that is different from the first terminal;

converting, by a data driver, data of an input image to the gamma-compensated voltages to output data voltages;

distributing, by a multiplexer disposed between the data driver and a plurality of data lines, the data voltages output from the data driver to a plurality of data lines by supplying data voltages input through one output channel of the data driver to a plurality of the data lines in a time-division manner using a plurality of transistors; and alternately varying the first and second power supply voltages with each frame or with each horizontal period.

16. The method of claim 15, wherein the power supply alternately varies the first power supply voltage and the second power supply voltage with each frame or with each horizontal period.

17. The method of claim 16, wherein distributing the data voltages includes:

distributing, by a first multiplexer, data voltages of a first plurality, input in an Nth frame (where N is a positive integer) or Nth i horizontal period (where i is 1 or 2), to a plurality of odd-numbered data lines, and distributing, by the first multiplexer, data voltages of a second polarity, input in an (N+1)th frame or (N+1)th i horizontal period, to the odd-numbered data lines; and distributing, by a second multiplexer, data voltages of a second polarity, input in the Nth frame or Nth i horizontal period, to a plurality of even-numbered data lines, and distributing data voltages of the first polarity, input in the (N+1)th frame or (N+1)th i horizontal period, to the even-numbered data lines.

18. The method of claim 17, further comprising:

generating power supply data indicating the voltage levels of the first and second power supply voltages; and adjusting the first and second power supply voltages by multiplying the power supply data by a ratio (b/a) of a rate (a) of change of the voltage on pixels connected to the odd-numbered data lines to a rate (b) of change of the voltage on pixels connected to the even-numbered data lines.

19. The method of claim 15, wherein the display panel is driven at a frame rate of 1 Hz to 30 Hz.

20. The liquid-crystal display device of claim 1, wherein the gamma-compensated voltage generator includes at least one voltage divider, wherein the power supply is configured to supply the first power supply voltage to a first terminal of the at least one voltage divider and to supply the second power supply voltage to a second terminal of the at least one voltage divider that is different from the first terminal.

* * * * *